(12) United States Patent
Rangegowda

(10) Patent No.: US 12,221,153 B2
(45) Date of Patent: Feb. 11, 2025

(54) DIFFERENTIAL ENERGY ABSORBING STEERING COLUMN

(71) Applicant: Volvo Truck Corporation, Gothenburg (SE)

(72) Inventor: Punith Rangegowda, Bangalore (IN)

(73) Assignee: Volvo Truck Corporation, Gothenburg (SE)

( * ) Notice: Subject to any disclaimer, the term of this patent is extended or adjusted under 35 U.S.C. 154(b) by 0 days.

(21) Appl. No.: 18/559,396

(22) PCT Filed: Jun. 4, 2021

(86) PCT No.: PCT/EP2021/065018
§ 371 (c)(1),
(2) Date: Nov. 7, 2023

(87) PCT Pub. No.: WO2022/253446
PCT Pub. Date: Dec. 8, 2022

(65) Prior Publication Data
US 2024/0227910 A1   Jul. 11, 2024

(51) Int. Cl.
*B62D 1/19* (2006.01)
*B62D 1/184* (2006.01)

(52) U.S. Cl.
CPC ............. *B62D 1/195* (2013.01); *B62D 1/184* (2013.01)

(58) Field of Classification Search
CPC ................................ B62D 1/195; B62D 1/184
See application file for complete search history.

(56) References Cited

U.S. PATENT DOCUMENTS

| | | | |
|---|---|---|---|
| 7,264,274 B2 | 9/2007 | Ridgway et al. | |
| 2008/0196536 A1* | 8/2008 | Manwaring | B62D 1/184 74/493 |
| 2017/0129531 A1* | 5/2017 | Regner | B62D 5/06 |
| 2020/0339179 A1 | 10/2020 | Nozawa et al. | |

FOREIGN PATENT DOCUMENTS

CN    107351908 A    11/2017
DE    102014104354 B3    4/2015

OTHER PUBLICATIONS

International Search Report and Written Opinion for International Patent Application No. PCT/EP2021/065018, mailed Feb. 23, 2022, 11 pages.

* cited by examiner

*Primary Examiner* — Jason D Shanske
*Assistant Examiner* — Scott Lawrence Strickler
(74) *Attorney, Agent, or Firm* — Withrow & Terranova, PLLC

(57) ABSTRACT

A steering column for a vehicle comprising a main jacket having a steering input shaft and a secondary jacket, the main jacket being in slidable contact with the secondary jacket; a mount bracket being configured to be attached to the vehicle; a tilt bracket being rigidly connected to the mount bracket with a first tear sheet; the secondary jacket being pivotally adjustable within the tilt bracket, and the secondary jacket being in slidable contact with the tilt bracket; a tilt locking mechanism being configured to enable/stop the tilt movement of the secondary jacket; a telescopic locking means being configured to enable/stop the telescopic movements between the main jacket, the secondary jacket, and the tilt bracket; the first tear sheet being fixed to the mount bracket and the tilt bracket; and a secondary tear sheet being fixed to the secondary jacket and the main jacket.

18 Claims, 26 Drawing Sheets

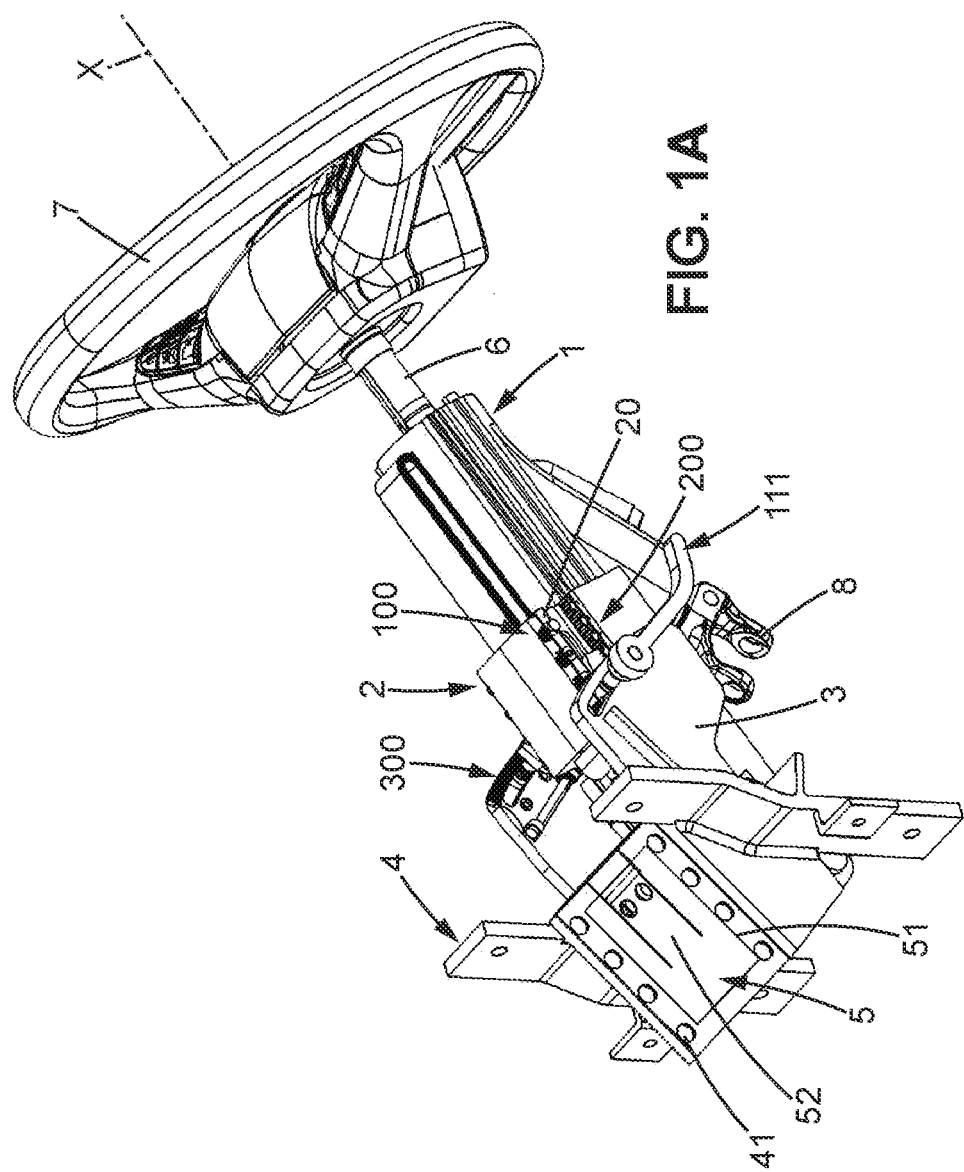

DIFFERENTIAL ENERGY ABSORBING STEERING COLUMN

This application is a 35 USC 371 national phase filing of International Application No. PCT/EP2021/065018, filed Jun. 4, 2021, the disclosure of which is incorporated herein by reference in its entirety.

FIELD OF THE INVENTION

The invention relates generally to vehicle control, specifically to an adjustable steering assembly for a truck. The invention discloses the adjustable steering column that longitudinally collapses during a vehicle crash for absorption of occupant crash energy. The invention also discloses a differential dual-collapse mechanism along with a tilt & telescopically adjustable mechanism.

BACKGROUND OF THE DISCLOSURE

A vehicle control system, generally known as steering assembly usually comprises a steering wheel that is in direct contact with a driver and connected to a steering column via a steering input shaft. The steering column usually comprises an intermediate steering shaft that provides the link between the steering column and a steering gearbox shaft to drive the wheels of the vehicle.

Furthermore, to adjust a distance of the steering wheel with respect to the dashboard of the vehicle, there is usually provided a telescopic mechanism enabling a telescopic movement along an axis of the steering input shaft. Also, to adjust a height of the steering wheel with respect to the floor of the vehicle, there is provided a tilt mechanism enabling a tilt movement of the steering wheel. Steering columns currently available in vehicles, e.g. trucks, use a pneumatic mechanism that is configured to lock/unlock the tilt and telescopic mechanism for longitudinal and vertical adjustment of the steering column. The pneumatic mechanism is, however, unnecessarily complex and adds additional weight to the entire steering mechanism.

The longitudinal adjustment (telescopic movement) can be understood as a movement of the steering wheel and associated steering column in a direction parallel to the axis of the steering shaft (usually corresponding to the longitudinal axis of a vehicle) to adjust the distance of the steering wheel with respect to the dashboard of the vehicle.

The vertical adjustment (tilt movement) can be understood as a movement of the steering wheel and associated steering column in a vertical direction to set the inclination of the steering wheel/steering column with respect to the horizontal plane, to adjust the height of the steering wheel with respect to the floor of the vehicle.

Also, the existing steering columns are typically rigid type steering columns that do not have any energy absorption characteristics built-in in the column structure that would provide absorption of the energy during a crash event to reduce an injury of a driver. Consequently, in a case of a crash event, the steering wheel attached to the steering column intrudes the driver's chest/pelvis area and causing a high level of injury/trauma to the driver. That is, the kinetic energy of the driver is directly transferred to the rigid steering wheel and the steering column.

It is thus desirable to provide a steering column that would offer the tilt/telescopic mechanism with a high level of variability in terms of adjustment options for better ergonomic position and to provide a steering column that would be capable to absorb the kinetic energy of a driver in case of a crash event.

SUMMARY OF THE DISCLOSURE

According to one aspect of the present invention, it is disclosed steering column for a vehicle comprising:
  a main jacket having a steering input shaft having a central axis, and a secondary jacket, the main jacket being in slidable contact with the secondary jacket defining a primary telescopic movement of the steering column;
  a mount bracket configured to be attached to the vehicle;
  a tilt bracket being rigidly connected to the mount bracket with a first tear sheet;
  the secondary jacket being pivotally adjustable within the tilt bracket so as to define a tilt movement of the steering column, and the secondary jacket being in slidable contact with the tilt bracket so as to define a secondary telescopic movement;
  a tilt locking mechanism configured to (i) enable the tilt movement of the secondary jacket together with the main jacket with respect to the tilt bracket when the tilt locking mechanism are in a release state, and (ii) stop the tilt movement of the secondary jacket together with the main jacket with respect to the tilt bracket when the tilt locking mechanism are in a locking state;
  a telescopic locking means comprising:
    a main locking mechanism configured to (i) enable the primary telescopic movement between the main jacket and the secondary jacket when the main locking mechanism is in a release state, and (ii) stop the primary telescopic movement between the main jacket and the secondary jacket when the main locking mechanism is in a locking state; and
    a secondary locking mechanism configured to (i) enable the secondary telescopic movement between the secondary jacket and the tilt bracket when the secondary locking mechanism is in a release state, and (ii) stop the secondary telescopic movement between the secondary jacket and the tilt bracket when the secondary locking mechanism is in a locking state; and
  a lever being coupled to the tilt locking mechanism and the telescopic locking means, the lever being configured to be positioned at least in a first position and a second position, wherein
    (i) in the first position of the lever, the tilt locking mechanism, the main locking mechanism and the secondary locking mechanism are configured to be in the locking state, and
    (ii) in the second position of the lever the tilt locking mechanism, the main locking mechanism and the secondary locking mechanism are configured to be in the release state,
  wherein the first tear sheet comprises a body fixed to the mount bracket and a deformable portion fixed to the tilt bracket, the deformable portion being configured to deform along the central axis direction in case of the steering column is exposed to an external force along the central axis; and
  wherein the main locking mechanism comprises a secondary tear sheet having a body being fixed to the secondary jacket and a deformable portion fixed to the main jacket, the deformable portion being configured to deform along the central axis direction in case of the steering column is exposed to the external force.

Thanks to this arrangement, the steering column can be adjusted in both the telescopic movement (first and second) and the tilt movement simultaneously. It is thus possible to set the desired position of the steering column by using the single lever to enable both the tilt and telescopic movement simultaneously as per the driver's comfortable driving position. The single lever operation can be also so-called one-touch tilt-telescopic lever arrangement that enables a high level of variability in terms of the vertical adjustment (inclination of the steering column with respect to the horizontal plane) as well as the longitudinal adjustment of the steering column as per driver's comfortable driving position. The invention thus provides a high level of variability of the movements in a compact and light arrangement suitable for vehicles, where compactness and weight of every part is a key feature.

The telescopic movement of either the main jacket with respect to the secondary jacket (primary telescopic movement) or the secondary jacket with respect to the tilt bracket (secondary telescopic movement) is defined as a movement along the central axis of the steering input shaft or as a movement parallel to the central axis of the steering input shaft that enables to adjust the longitudinal position of the steering column. The tilt movement is defined as a pivoting movement of the secondary jacket (with the main jacket positioned within the secondary jacket) with respect to the tilt bracket. By tilt movement, it is possible to adjust the inclination/vertical position of the steering column as per the driver's comfortable driving position. The inclination of the steering column is defined as an angle between the horizontal plane and the central axis of the steering input shaft. In a usual configuration, the steering column is connected to the steering wheel through the steering input shaft.

Additionally, the steering column is capable to be inclined of about 50-60 degrees with respect to the horizontal plane (typical known columns in trucks can be tilt of about 30 degrees with respect to the horizontal plane). Having such capabilities of inclination, the steering column is closed in terms of adjustment to steering columns known to the passenger cars. This also provides an advantage in crash events since the area of the steering wheel (connected to the steering column) contacting the driver's chest is larger and consequently leads to more load distribution onto the driver's chest to reduce a possible health injury.

Furthermore, the telescopic movement range of the steering column can be about 190 mm compared to the typically known steering columns in trucks having the telescopic movement range of about 70-100 mm). Therefore, a high-level longitudinal adjustment of the steering column is provided, and more ergonomic tilt-telescopic adjustment is provided.

Besides, thanks to the arrangement defined above, the steering column is collapsible under the external force initiated by a driver in case of a crash event (e.g. a frontal impact of a vehicle into an obstacle). This reduces the driver's injury/trauma directly caused by the impact on the steering wheel attached to the steering column. The presence of both the first tear sheet and the second tear sheet can be so-called as a dual-collapse mechanism of the steering column offering two deformation zones positioned in different locations of the steering column. It is thus possible to provide a steering column having two different energy absorption zones. Besides, as will be explained later, also a single-collapse mechanism can be implemented.

In addition, the combination of the tilt/telescopic mechanism together with the dual-collapse mechanism provides an enhanced steering column where the position of the steering wheel attached there onto can be properly adjusted to suit a different kind of driver anthropometry, whereas the adjustment of the inclination and longitudinal position of the steering column further helps to effectively transform the kinetic energy of a driver into the steering wheel/column in case of a crash event. Thus, having the collapsible steering column without a high level of variability in terms of adjustment in vertical/longitudinal direction (to correctly adjust the steering column with respect to the driver position), may not be beneficial in case of crash events.

According to another aspect, the deformable portion of each of the first and second tear sheets can be delimited by at least one weakening line extending parallel along the central axis so as to be at least partially torn off from the body when the steering column is exposed to the external force.

In case of a crash event (e.g. a frontal impact of a vehicle), the kinetic energy of a driver is transferred to the steering column via the steering wheel and primarily absorbed by the deformable portion of the tear sheets. Thanks to the at least one weakening line, the deformable portion is delimited from the body of the tear sheets to define a deformation path that absorbs the driver's kinetic energy and reduces the driver's injury.

According to another aspect, the secondary jacket may further comprise:
- a first block and a second block configured to define a housing receiving the main jacket, wherein the main locking mechanism comprises a first top portion rigidly attached to the first block, and a second top portion
- wherein the second top portion is movable with respect to the first top portion in a transverse direction perpendicular to the central axis so that in the release state of the main locking mechanism, the second top portion is disengaged from the main jacket, and in the locking state of the main locking mechanism, the second top portion engages the main jacket;
- the second top portion being elastically returned to the locking state.

According to another aspect, the second top portion may comprise an engaging block attached to the deformable portion of the secondary tear sheet and provided with an engaging member configured to cooperate with a complementary engaging member of the main jacket such that:
- in the locking state of the main locking mechanism, the engaging member is configured to be engaged with the complementary engaging member of the main jacket, and
- in the release state of the main locking mechanism, the engaging member is configured to be disengaged with the complementary engaging member of the main jacket.

According to another aspect, the second top portion may further comprise a slider block to which the engaging block is attached through a breakable connection.

According to another aspect, when the steering column is exposed to the external force in the direction substantially parallel to the central axis, the breakable connection is configured to break such that the main jacket, the engaging block and the deformable portion of the secondary tear sheet are configured to move along the central axis direction with respect to the secondary jacket.

The movement of the main jacket, engaging block, and the deformable portion can be thus defined as the tearing of the deformable portion from the body of the secondary tear sheet in the direction parallel to the central axis with respect to the secondary jacket.

According to another aspect, the breakable connection may be in the form of a plurality of pins made of resin.

Thanks to this configuration the connection between the slider block and the engaging block may be configured to break under a certain level of the external force (kinetic energy of a driver) that is transmitted into the pins through the steering column. The steering column and in particular the dual-collapse mechanism is thus protected from damage caused by minor external forces generated by normal usage of the steering wheel.

According to another aspect, the engaging member of the engaging block and the complementary engaging member of the main jacket may be in the form of a plurality of teeth.

According to another aspect, the secondary locking mechanism may comprise a lever latch being rotationally fixed to the lever such that the movement of the lever between the first and second position is configured to be translated to the lever latch, said lever latch comprising an engaging member configured to cooperate with a complementary engaging member of the secondary jacket;
  wherein in the first position of the lever, the engaging member of the lever latch is configured to be engaged with the complementary engaging member of the secondary jacket; and
  in the second position of the lever, the engaging member of the lever latch is configured to be disengaged with the complementary engaging member of the secondary jacket.

According to another aspect, the secondary jacket may further comprise a pair of elongated portions, a pair of top portion slots and a pair of end portion slots;
  wherein the first top portion slot is configured as a through hole located within the first top portion, and the second top portion slot is configured as a through hole located within the second top portion;
  wherein the pair of elongated portions are configured to protrude out of the housing towards the mount bracket in a direction parallel to the central axis, each of the end portions slot is located within the respective elongated portion; and
  wherein the lever is configured to pass through the tilt bracket and the pair of top portion slots, and
  wherein a length dimensions along the central axis of the top portion slots and the end portion slots define the secondary telescopic movement between the secondary jacket and the tilt bracket.

According to another aspect, the main jacket may further comprise a main body part and a main top portion, said main top portion defining an elongated slot;
  wherein the lever is configured to pass through the tilt bracket, the pair of top portion slots and the elongated slot such that a length dimension along the central axis of the elongated slot defines the primary telescopic movement between the main jacket and the secondary jacket.

According to another aspect, the engaging member of the of the lever latch and the complementary engaging member of the secondary jacket are in the form of a plurality of teeth.

According to another aspect, the tilt bracket may further comprise a fixing portion through which the tilt bracket is rigidly connected to the mount bracket, and a pair of side walls;
  wherein each of the side walls comprises a tilting slot through which the lever is configured to pass through, said tilting slot is configured to define a lower-most position and an upper-most position of the tilt movement; and
  a tilting pin that is configured to pass through the side walls of the tilt bracket and the pair of end portion slots of the secondary jacket, said tilting pin is configured to define a rotational axis of the tilt movement.

According to another aspect, the tilt locking mechanism may comprise:
  a tilt plate being rigidly fixed to the one side wall of the tilt bracket; and
  a tilt latch being configured to slight along the tilt plate in a direction corresponding to the tilt movement, said tilt latch having an engaging member configured to cooperate with a complementary engaging member of the tilt plate so that
  in the locking state of the tilt locking mechanism, the engaging member of the tilt latch is configured to be engaged with the complementary engaging member of the tilt plate, and
  in the release state of the of the tilt locking mechanism, the engaging member of the tilt latch is configured to be disengaged with the complementary engaging member of the tilt plate; the tilt latch being elastically returned to the locking state.

According to another aspect, the tilt plate may comprise a tilt plate slot positionally corresponding to the tilting slot of the tilt bracket side wall, and a sliding column configured to guide the tilt latch; and
  the tilt latch comprising a through hole, wherein
  the lever is configured to pass through the tilting slot, the tilt plate slot and the tilt latch through hole.

According to another aspect, the tilt latch may be configured to have a rotational movement about an axis defined by the sliding column when the tilt locking mechanism is to be switched between the locking state and the release state.

According to another aspect, a vehicle comprises the steering column, wherein the mount bracket of the steering column is rigidly fixed to chassis of the vehicle According to another aspect, use of the steering column, wherein initially the lever is in the first position and the tilt locking mechanism, the main locking mechanism and the secondary locking mechanism are in the locking state, comprises:
  actuating the lever to move said lever from the first position to the second position, said tilt locking mechanism, the main locking mechanism and the secondary locking mechanism being in the release state;
  adjusting a position of the steering column so as to move the steering wheel in any one of the primary telescopic movement, secondary telescopic movement or tilt movement;
  actuating the lever to move said lever from the second position to the first position, said tilt locking mechanism, the main locking mechanism and the secondary locking mechanism being back in the locking state;
  in case of exposing the steering column to the external force along the central axis (x), deforming the deformable portion of the secondary tear sheet along the central axis (x) and/or deforming the deformable portion of the first tear sheet along the central axis (x).

BRIEF DESCRIPTION OF THE DRAWINGS

Other features and advantages of the invention appear from the following detailed description of some of its embodiments, given by way of non-limiting example, and with reference to the accompanying drawings, in which:

FIGS. 1A-1B show a schematic view of the steering assembly;

DETAILED DESCRIPTION OF THE DISCLOSURE

In the figures, the same references denote identical or similar elements, unless stated otherwise.

Figure 1B:
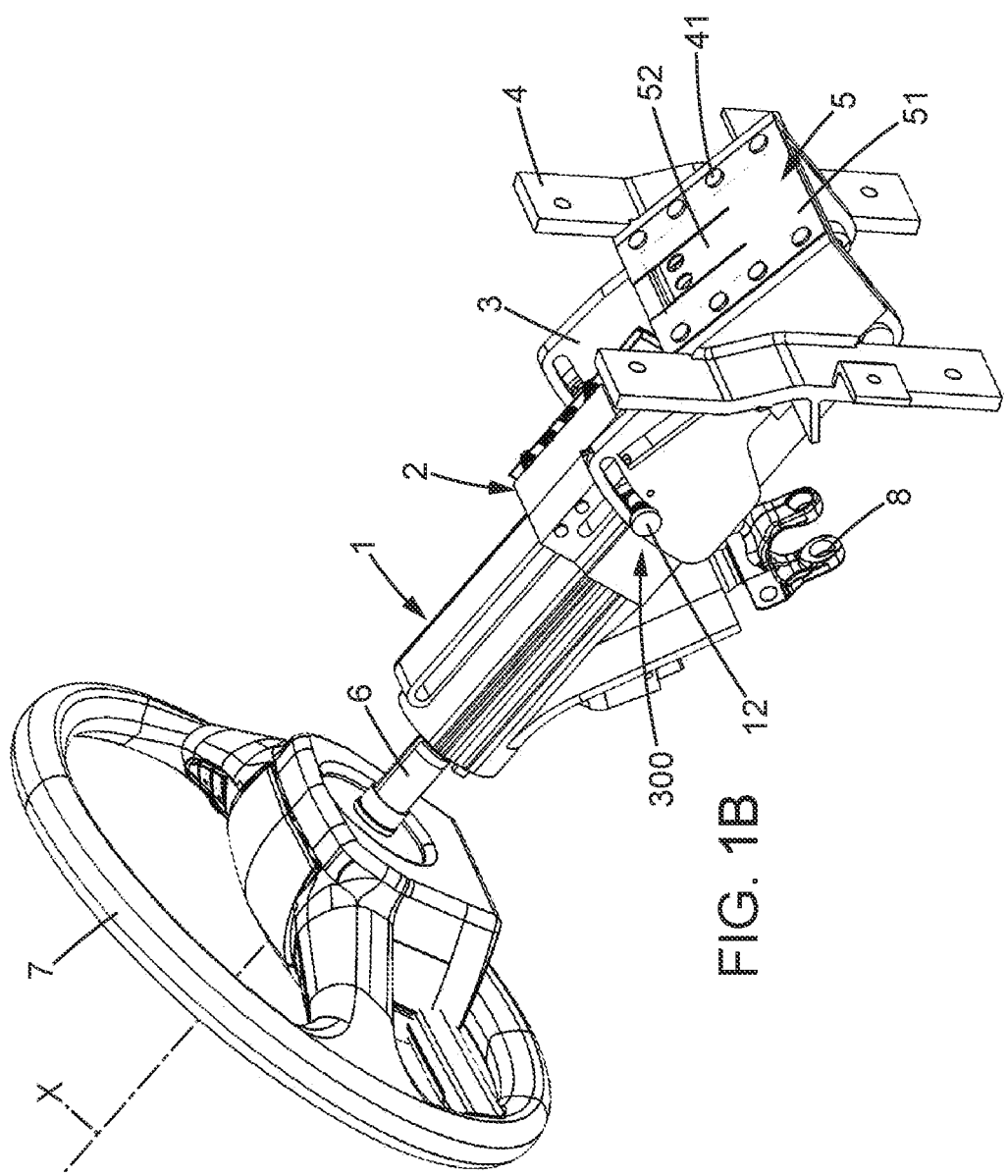

FIGS. 1A and 1B show a schematic view of a steering assembly of a vehicle comprising a steering wheel 7 and a steering column. The vehicle may be any type of suitable vehicle that is adapted to have the steering assembly mounted there inside. For instance, an example of a vehicle may be, but is not limited to, a heavy-duty vehicle such as a truck.

The steering column comprises a main jacket 1 that is configured to have a steering input shaft 6 mounted inside. The steering input shaft 6 is configured to have the steering wheel attached there onto. The steering input shaft 6 is further defined by a central axis (x) that is an axis of rotation of the steering input shaft 6 and defining the longitudinal direction of the steering input shaft 6. The steering input shaft 6 may be further connected to an intermediate steering shaft having a universal joint 8 that may be configured to be linked to a steering gearbox shaft that in turn drives the wheels of a vehicle (not shown).

The steering column also comprises a secondary jacket 2 providing accommodation for the main jacket 1 that is in slidable contact with the secondary jacket 2. The slidable contact may be provided, for instance, by a plurality of grooves and associated protrusions being defined either on an outer side surface of the main jacket 1 or on an inner side surface of the secondary jacket 2. The slidable contact between the main jacket 1 and the secondary jacket 2 defines the sliding movement between the main jacket 1 and the secondary jacket 2. The sliding movement further defines a primary telescopic movement of the steering column.

The steering column further comprises a tilt bracket 3 providing accommodation for the secondary jacket 2. More particularly, the secondary jacket 2 is pivotally adjustable within the tilt bracket 3 so as to define a tilt movement of the steering column.

The steering column further comprises a mount bracket 4 that is rigidly connected to the tilt bracket 3. The mount bracket 4 defining an accommodation for the tilt bracket 3 so as the tilt bracket 3 is located within the body of the mount bracket 4. In addition, the mount bracket 4 can be configured to be attached to a vehicle body. For instance, the mount bracket 4 can be attached to the chassis of the vehicle or to a cross truck beam, generally known as "CBT". The connection between the tilt bracket 3 and the mount bracket 4 is provided through a first tear sheet 5 and a plurality of bolts 41. For instance, the tear sheet 5 is fixed via the plurality of bolts 41 to an outer surface of the mount bracket 4 as well as to an outer surface of the tilt bracket 3 located within the mount bracket 4.

The primary telescopic movement between the main jacket 1 and the secondary jacket 2 can be defined as the slidable movement along the central axis (x). An available length of the primary telescopic movement can be for instance of about and up to 150 mm. The length of the primary telescopic movement is to be understood as a distance between a minimum retracted position and a maximum extended position of the main jacket 1 with respect to the secondary jacket 2.

Furthermore, the secondary jacket 2 is in slidable contact with the tilt bracket 3 to define a secondary telescopic movement. The secondary telescopic movement can be thus defined as a movement of the secondary jacket 2 together with the main jacket 1 with respect to the tilt bracket 3. The direction of the secondary telescopic movement is substantially the same as for the primary telescopic movement—along and parallel to the central axis (x). An available length of the secondary telescopic movement can be for instance of about and up to 40 mm. The length of the secondary telescopic movement is to be understood as a distance between a minimum retracted position and a maximum extended position of the secondary jacket 2 with respect to the tilt bracket 3.

Therefore, the capability of the steering column is to provide a combined telescopic movement that is a combination of the primary telescopic movement and the secondary telescopic movement. The total length available for the combined telescopic movement is for instance of about and up to 190 mm. The length of the combined telescopic movement is to be understood as a distance between a minimum retracted position and a maximum extended position of the steering column.

As shown in FIGS. 2A-2D, the steering column further comprises a telescopic locking means that is defined by a main locking mechanism 100 and the secondary locking mechanism 200.

Figure 2:
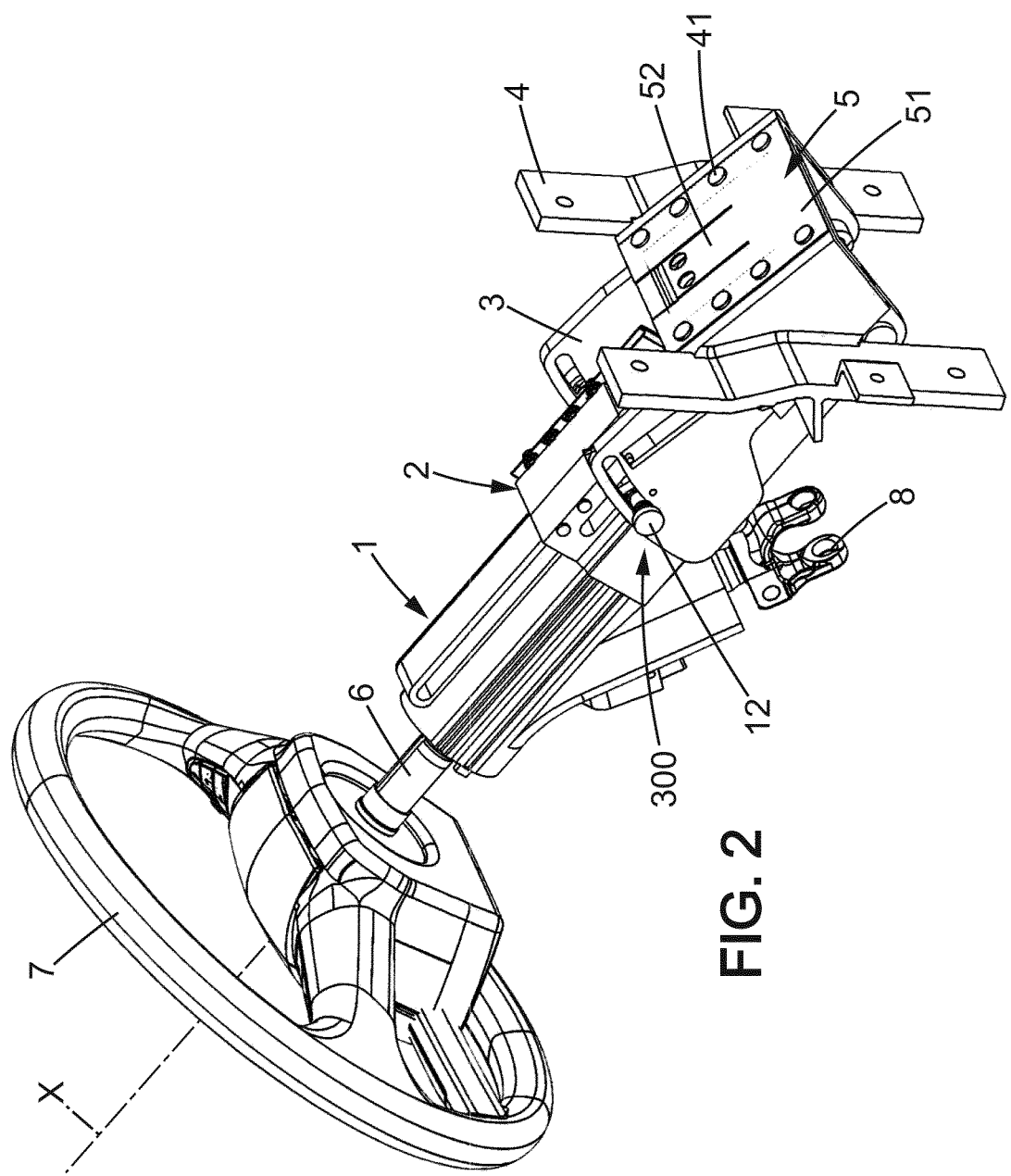
FIGS. 2A-2B show a schematic view of the steering assembly in a release state.
FIGS. 2C-2D show a schematic view of the steering assembly in a locking state.
Figure 2A:
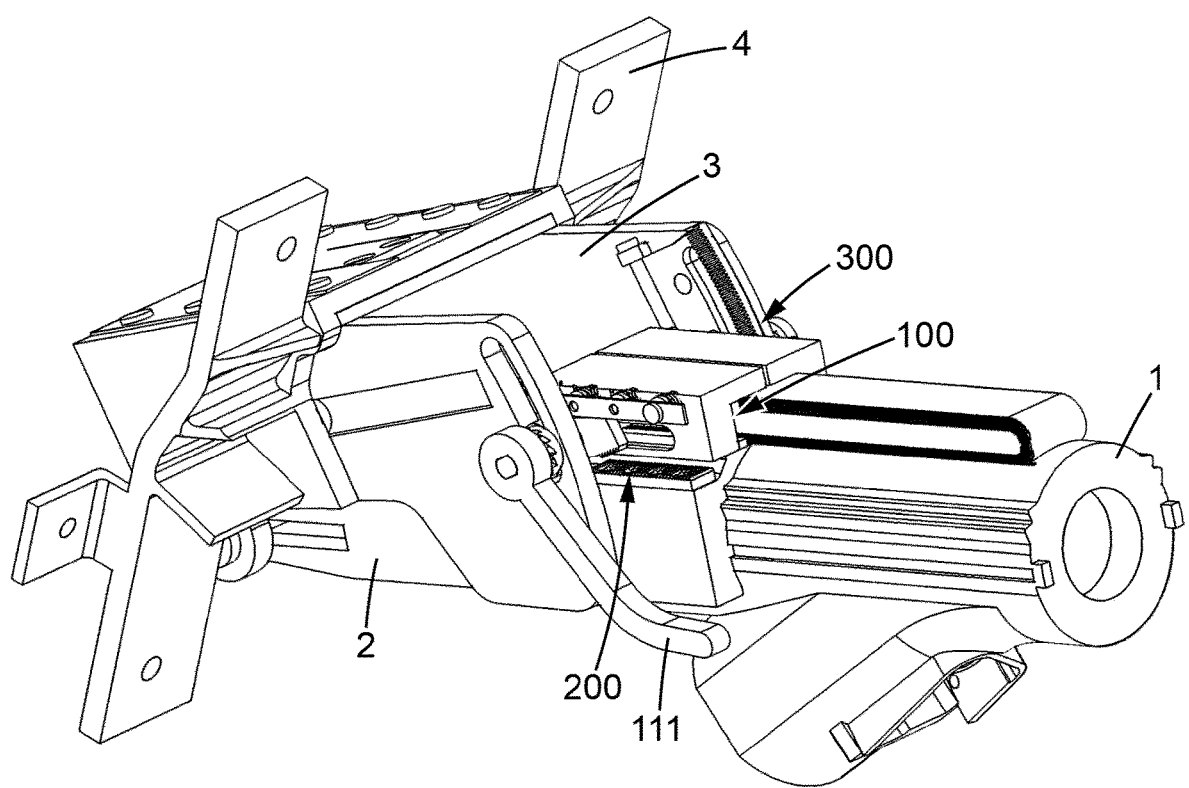
Figure 2B:
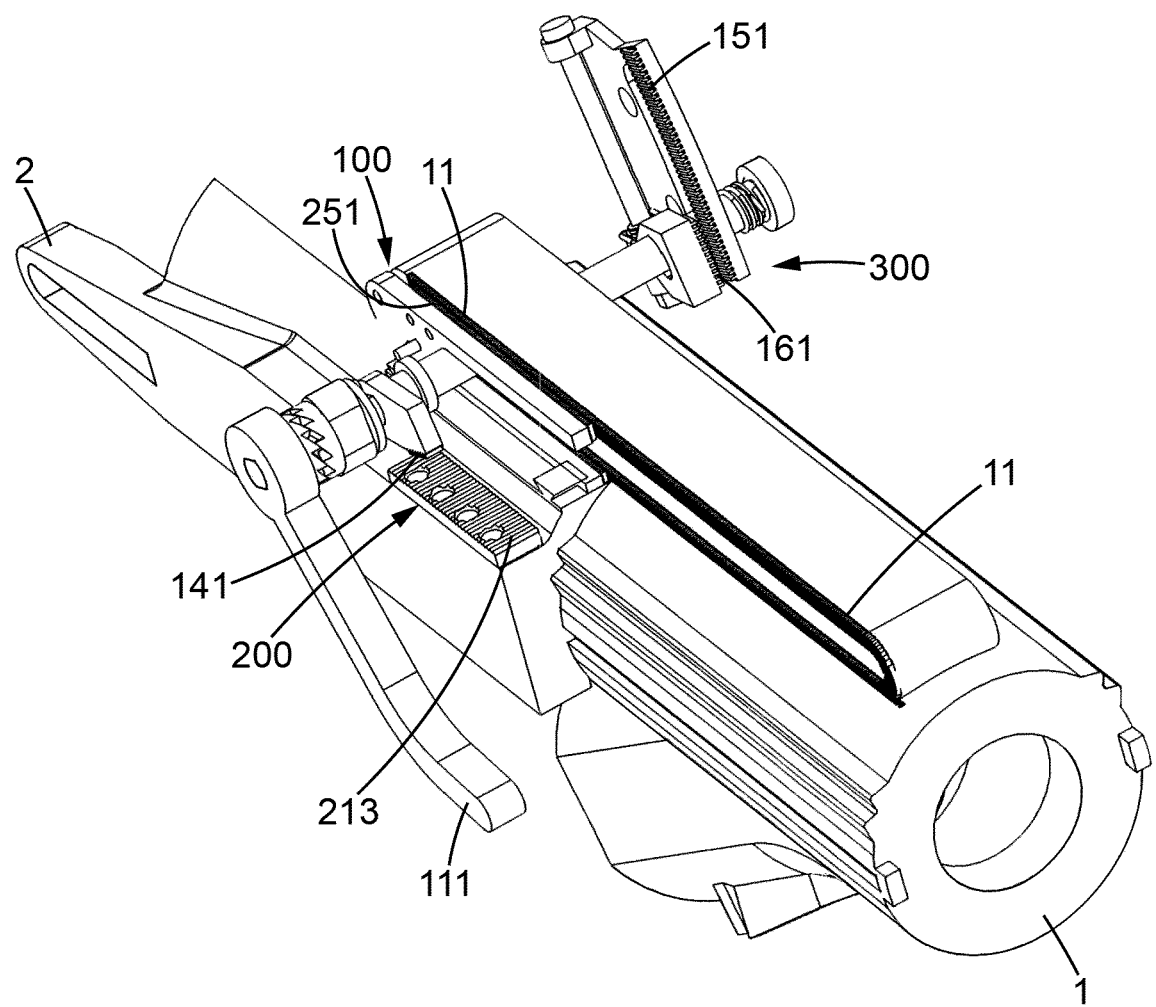
Figure 2C:
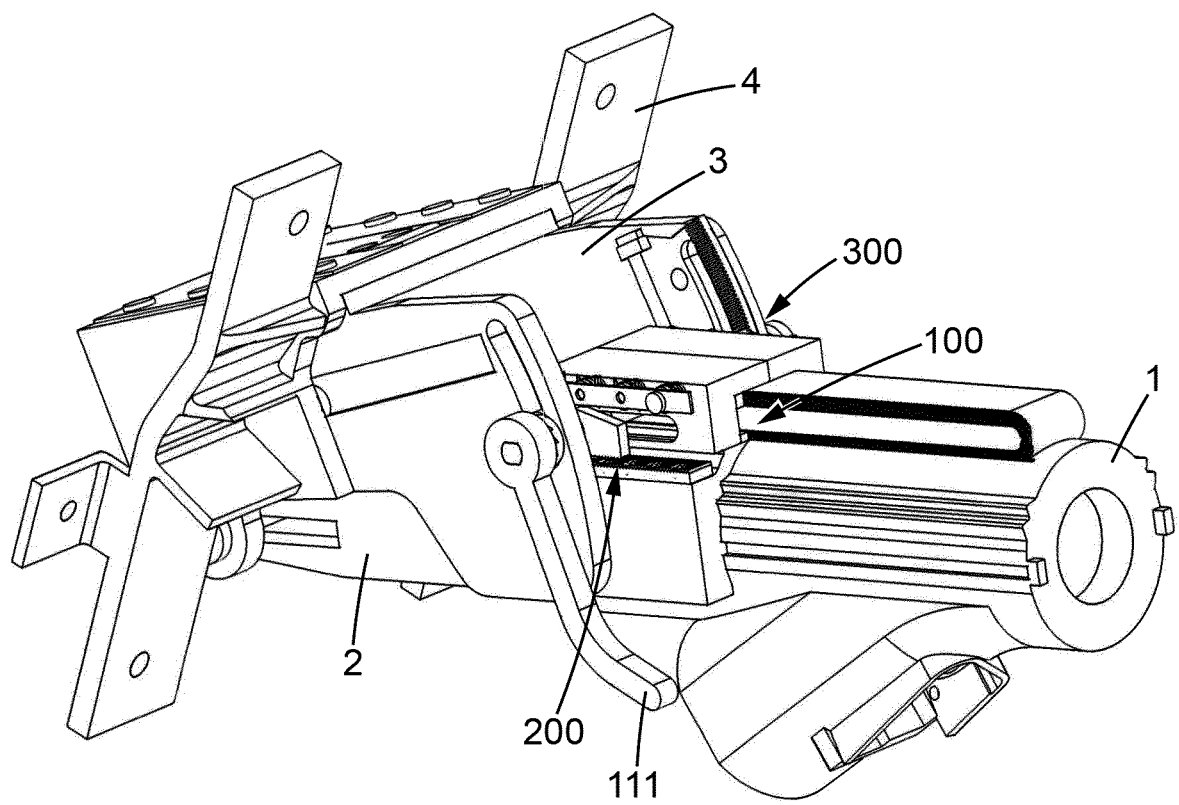
Figure 2D:
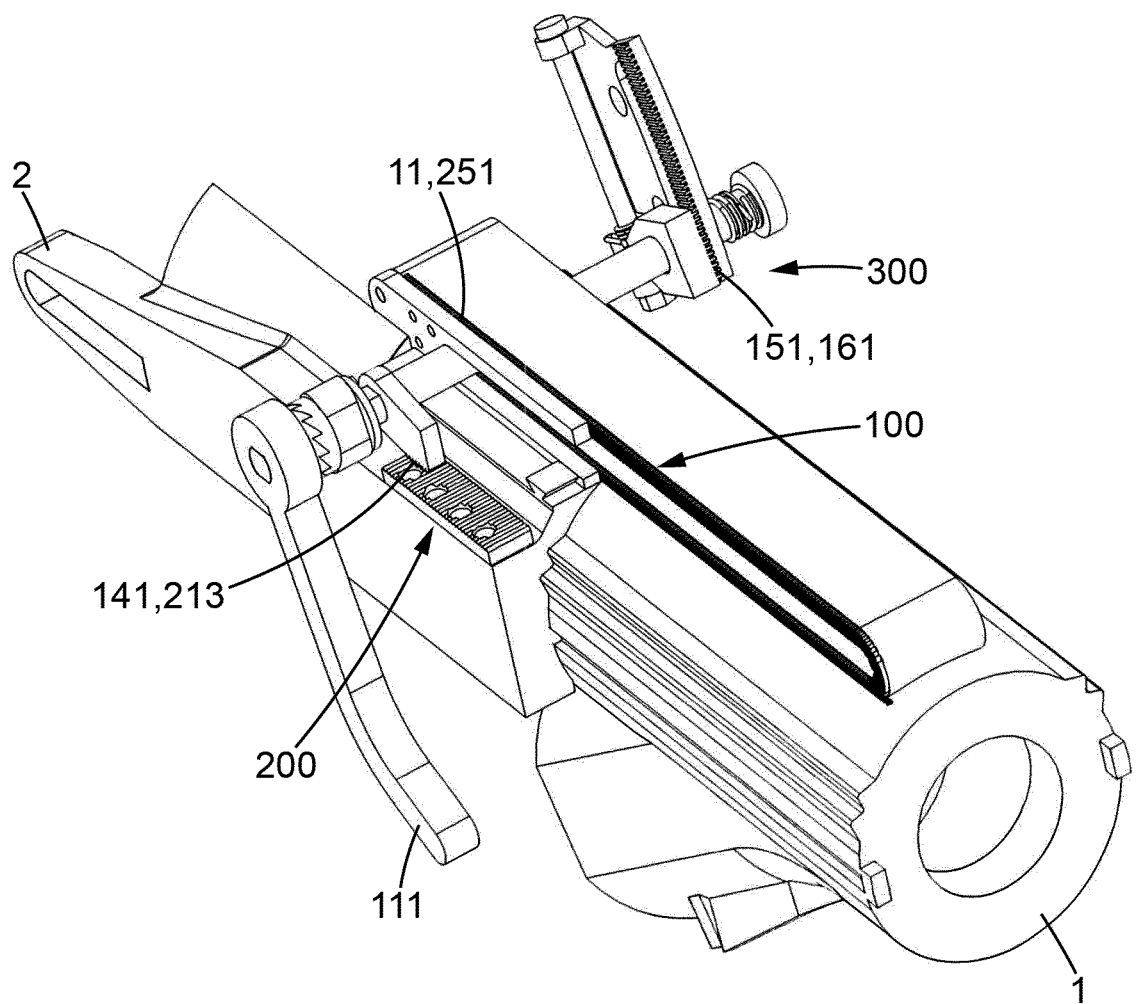

The main locking mechanism 100 is configured to enable the primary telescopic movement between the main jacket 1 and the secondary jacket 2 when the main locking mechanism 100 is in a release state (FIGS. 2A-2B), and to stop the primary telescopic movement between the main jacket 1 and the secondary jacket 2 when the main locking mechanism 100 is in a locking state (FIGS. 2C-2D).

Also, the secondary locking mechanism 200 is configured to enable the secondary telescopic movement between the secondary jacket 2 and the tilt bracket 3 when the secondary locking mechanism 200 is in a release state (FIGS. 2A-2B), and to stop the secondary telescopic movement between the secondary jacket 2 and the tilt bracket 3 when the secondary locking mechanism 200 is in a locking state (FIGS. 2C-2D).

As will be explained later, the tilt movement between the secondary jacket 2 and the tilt bracket 3 is provided about an axis defined by a tilting pin 34 that protrudes the tilt bracket 3 in a transverse direction perpendicular to the central axis (x). The tilt movement can be also defined by a lower-most position and an upper-most position of the secondary jacket 2 with respect to the tilt bracket 3, wherein the difference between these two positions is for instance about, but not limited to 14 degrees.

The steering column further comprises a tilt locking mechanism 300 that is configured to enable the tilt movement of the secondary jacket 2 together with the main jacket 1 with respect to the tilt bracket 3 when the tilt locking mechanism 300 is in a release state (FIGS. 2A-2B), and to stop the tilt movement when the tilt locking mechanism 300 is in a locking state (FIGS. 2C-2D).

Further, the steering column comprises a lever 111 that is configured to be coupled to the tilt locking mechanism 300 and the telescopic locking means. As shown in FIGS. 2A-2D, the lever 111 can be defined as having at least two positions in which the lever 111 can be positioned.

A first position of the lever 111, as shown in FIGS. 2C-2D, defines the locking state of the tilt locking mechanism 300 and the telescopic locking means. In particular, the first position of the lever 111 is configured to set the tilt locking mechanism 300, the main locking mechanism 100, and the secondary locking mechanism 200 into the locking state.

A second position of the lever 111, as shown in FIGS. 2A-2B, defines the release state of the tilt locking mechanism 300 and the telescopic locking means. In particular, the second position of the lever 111 is configured to set the tilt locking mechanism 300, the main locking mechanism 100, and the secondary locking mechanism 200 into the release state.

Figure 4A:
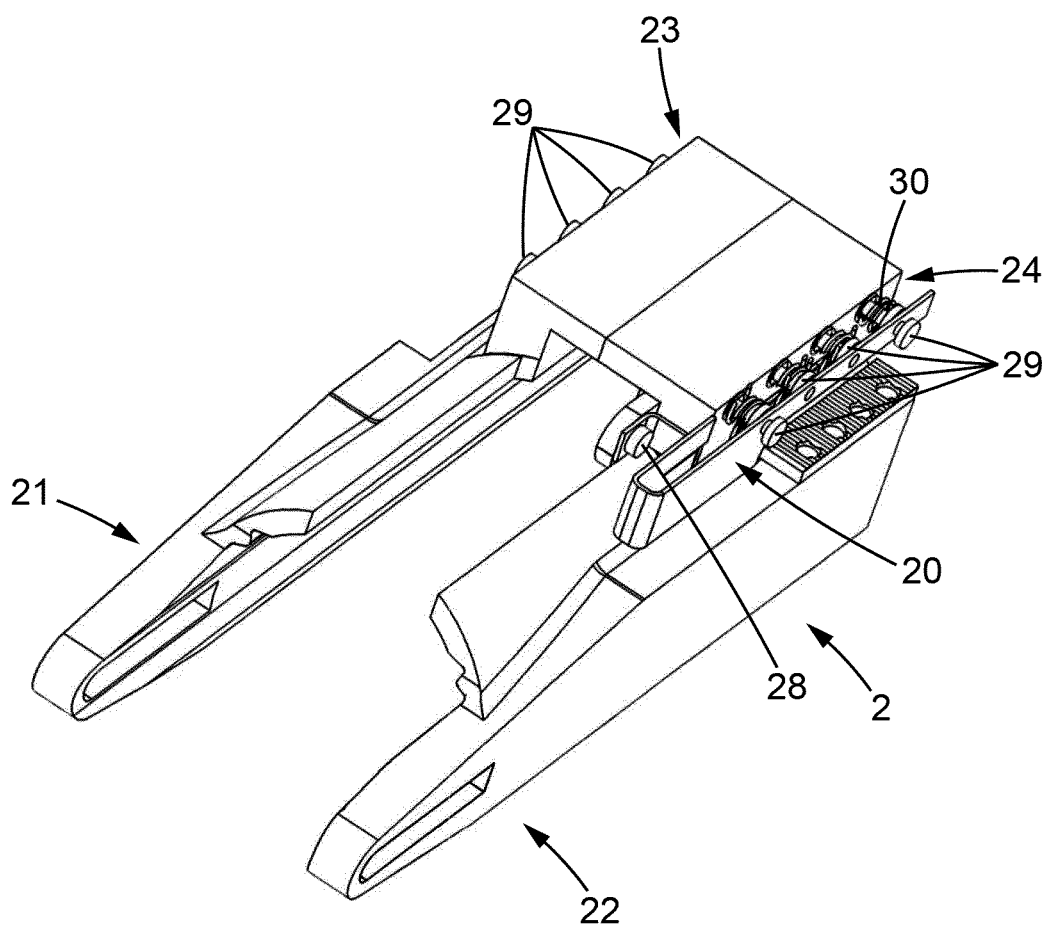
FIGS. 4A-4D show a schematic view of the secondary jacket.
Figure 4B:
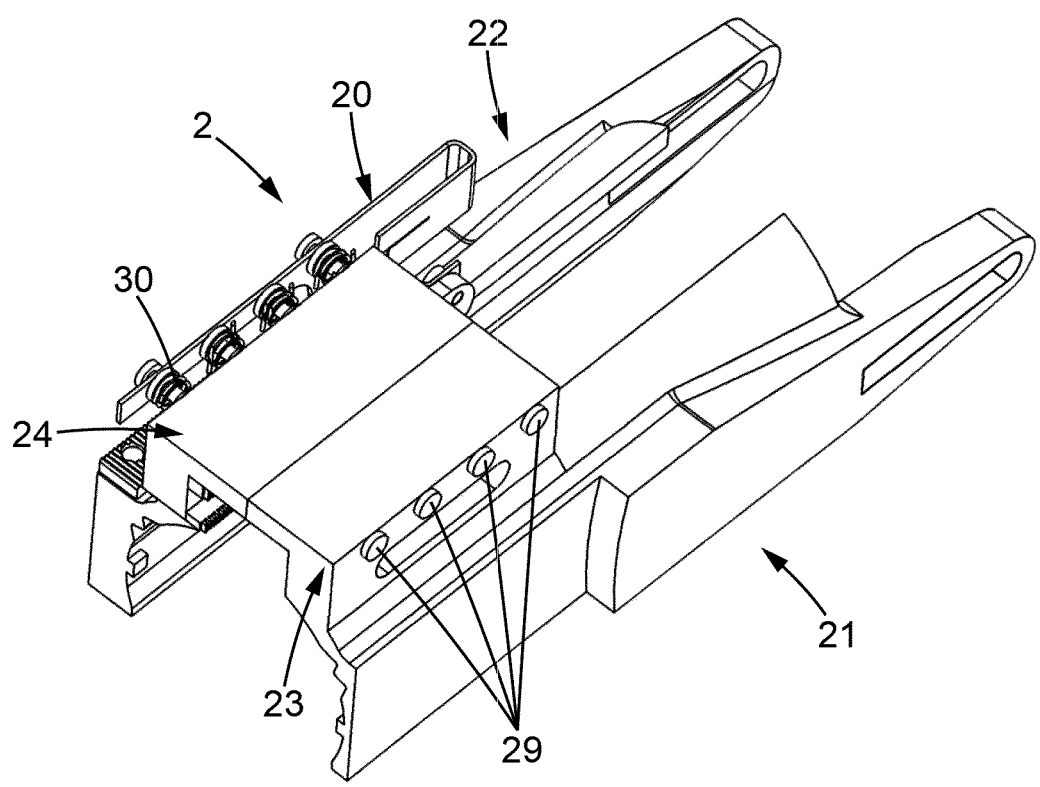
Figure 4C:
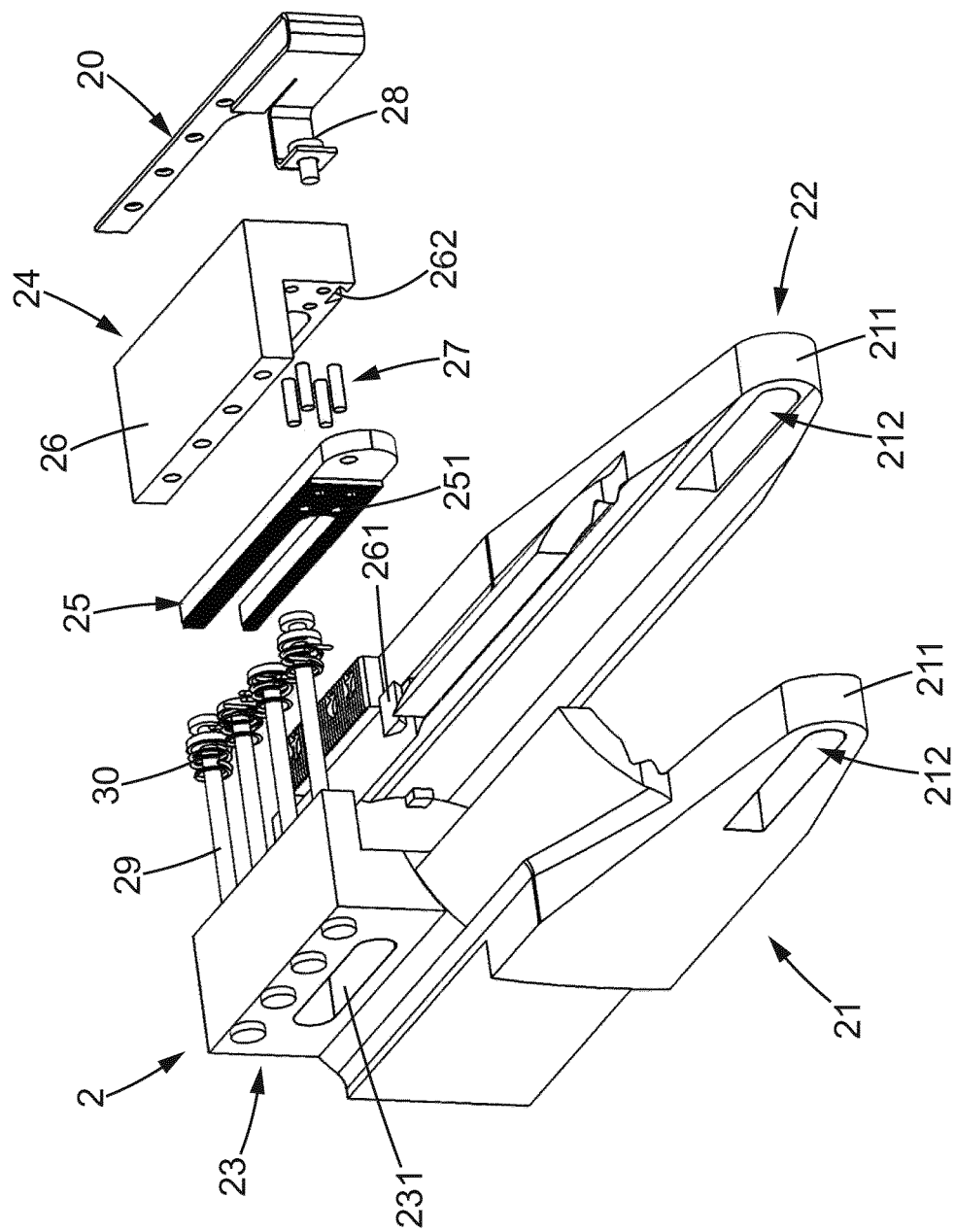
Figure 4D:
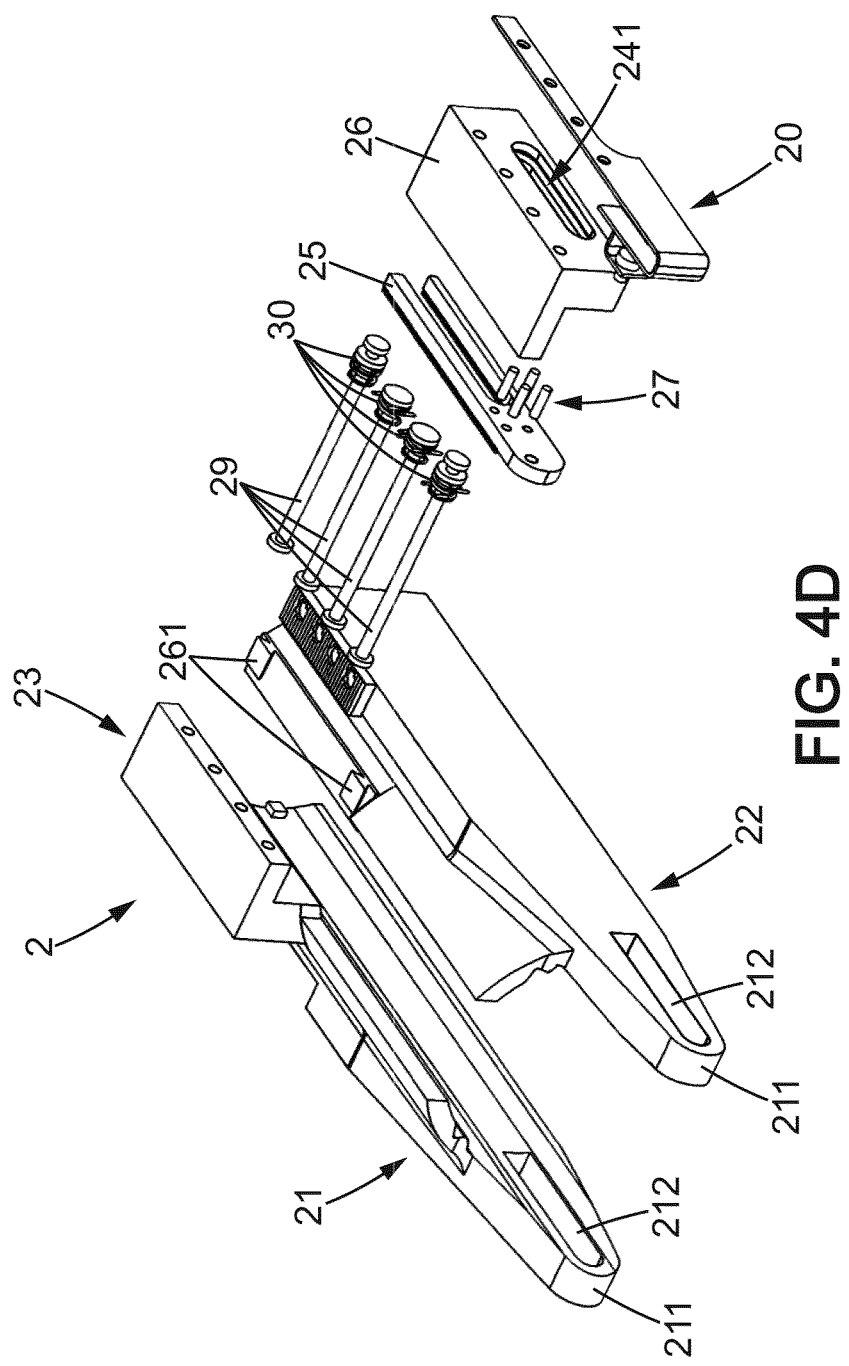
Figure 4E:
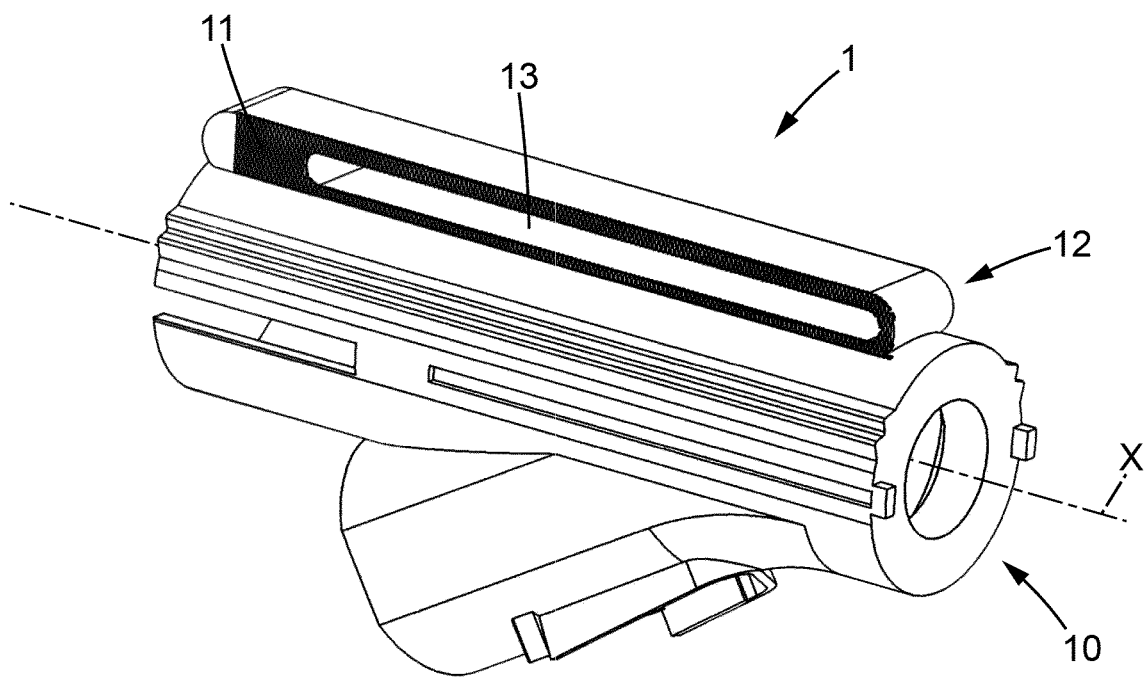
FIG. 4E shows a schematic view of the main jacket.

FIG. 4E shows the main jacket 1 comprising a main body part 10 and a main top portion 12 defining the upper part of the main jacket 1. The main top portion 12 can further comprise an elongated slot 13 and a complementary engaging member 11 which functions will be described later with respect to the secondary jacket 2. The elongated slot 13 can be defined as having a height dimension and a length dimension. The length dimension of the elongated slot 13 can be defined as a dimension along the central axis (x), whereas the height dimension can be defined as a dimension in the vertical direction perpendicular to the central axis (x). The length of the elongated slot 13 (along the central axis (x)) further defines a maximum available length of the primary telescopic movement. That is, the length dimension of the elongated slot 13 may be of about and up to 150 mm.

As an example of one possible embodiment, the complementary engaging member 11 can form an outer circumference area of the elongated slot 13.

The secondary jacket 2 as depicted in FIGS. 4A-4D will now be described in more detail. The secondary jacket 2 comprises a first block 21 and a second block 22 configured to define a housing. The housing is configured to receive the main jacket 1. The secondary jacket 2 further comprises a first top portion 23 that is rigidly fixed to the first block 21 and a second top portion 24. The first top portion 23 can be also an integral part of the first block 21. The second top portion 24 forms a movable part of the second block 22 and is configured to be movable with respect to the first top portion 23 in a transverse direction perpendicular to the central axis (x). The second top portion 24 can be also defined as movable with respect to the second block 22 in the direction perpendicular to the central axis (x).

The first top portion 23 and the movable second top portion 24 form a part of the main locking mechanism 100. That is, in the release state of the main locking mechanism 100 (FIGS. 2A-2B), the second top portion 24 is configured to be disengaged from the main jacket 1 to enable the primary telescopic movement. In the locking state of the main locking mechanism 100, the second top portion 24 is configured to be engaged with the main jacket 1 to stop the primary telescopic movement. Additionally, the second top portion 24 is configured to be elastically returned to the locking state. The elastic return of the top portion 24 between the release state and the locking state can be provided by an elastic member. As a non-limiting example of the elastic member, a coil spring 30 can be used.

In more detail, and as shown in FIGS. 4C-4D, the second top portion 24 further comprises a slider block 26 and an engaging block 25. The slider block 26 and the engaging block 25 are configured to be attached together. In one embodiment, the slider block 26 and the engaging block 25 are attached through a breakable connection. The engaging block 25 further comprises an engaging member 251 configured to cooperate with the complementary engaging member 11 of the main jacket 1. That is, in the locking state of the main locking mechanism 100, the engaging member 251 of the engaging block 25 is configured to be engaged with the complementary engaging member 11 of the main jacket 1, and in the release state of the main locking mechanism 100, the engaging member 251 is configured to be disengaged with the complementary engaging member 11 of the main jacket 1. In an example, the engaging member 251 and the complementary engaging member 11 can be in the form of plurality of teeth.

Furthermore, the engaging block 25 can be in a form of U-shaped block whereas a pair of legs constituting the U-shape extends along the central axis (x) and corresponds to the area of the complementary engaging member 11. That is, the pair of legs of the U-shaped block corresponds to the outer circumference area of the elongated slot 13 of the main jacket 1.

The first top portion 23 and the second top portion 24 can be movably connected to each other through the plurality of bolts 29. The bolts 29 are oriented in the transverse direction perpendicular to the central axis (x) and define the direction of movement of the second top portion 24. As shown in FIGS. 4A-4D, the plurality of bolts 29 is formed by four bolts, whereas the outer pair of bolts 29 provides fixation of a secondary tear sheet 20 to the secondary jacket 2 as well as guidance for the movable second top portion 24, and the inner pair of bolts 29 provide the guidance for the movable second top portion 24. The plurality of elastic members 30 can be provided onto each of the corresponding bolts 29. The number of bolts 29 and the number of elastic members serves as an example only. Any suitable number of bolts 29 and/or elastic members 30 can be provided.

Additionally, as shown in FIGS. 4C-4D, the second block 22 comprises a pair of wedge portions 261 configured to cooperate with a pair of wedge openings 262 of the second top portion 24. The wedge portions 261 and the wedge openings 262 provide additional guidance for the movable second top portion 24. The wedge portions 261 and the wedge openings 262 are thus oriented so as to enable sliding movement of the second top portion 24 in the transverse direction perpendicular to the central axis (x). In addition, the wedge openings 262 are disposed within the slider block 26.

Figure 7A:
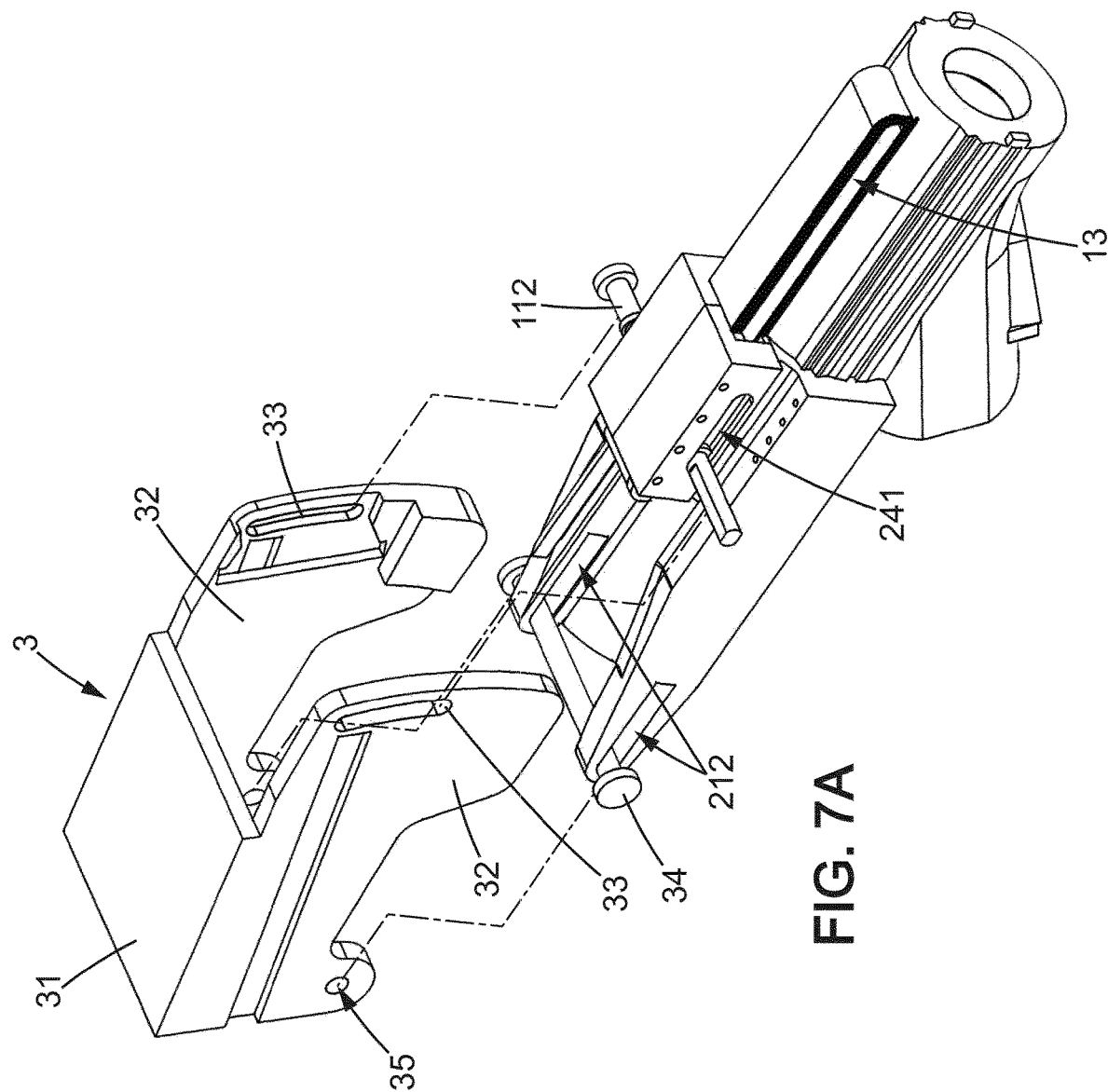
FIG. 7A shows a schematic view of the main jacket withing the secondary jacket and the tilt jacket.
Figure 7B:
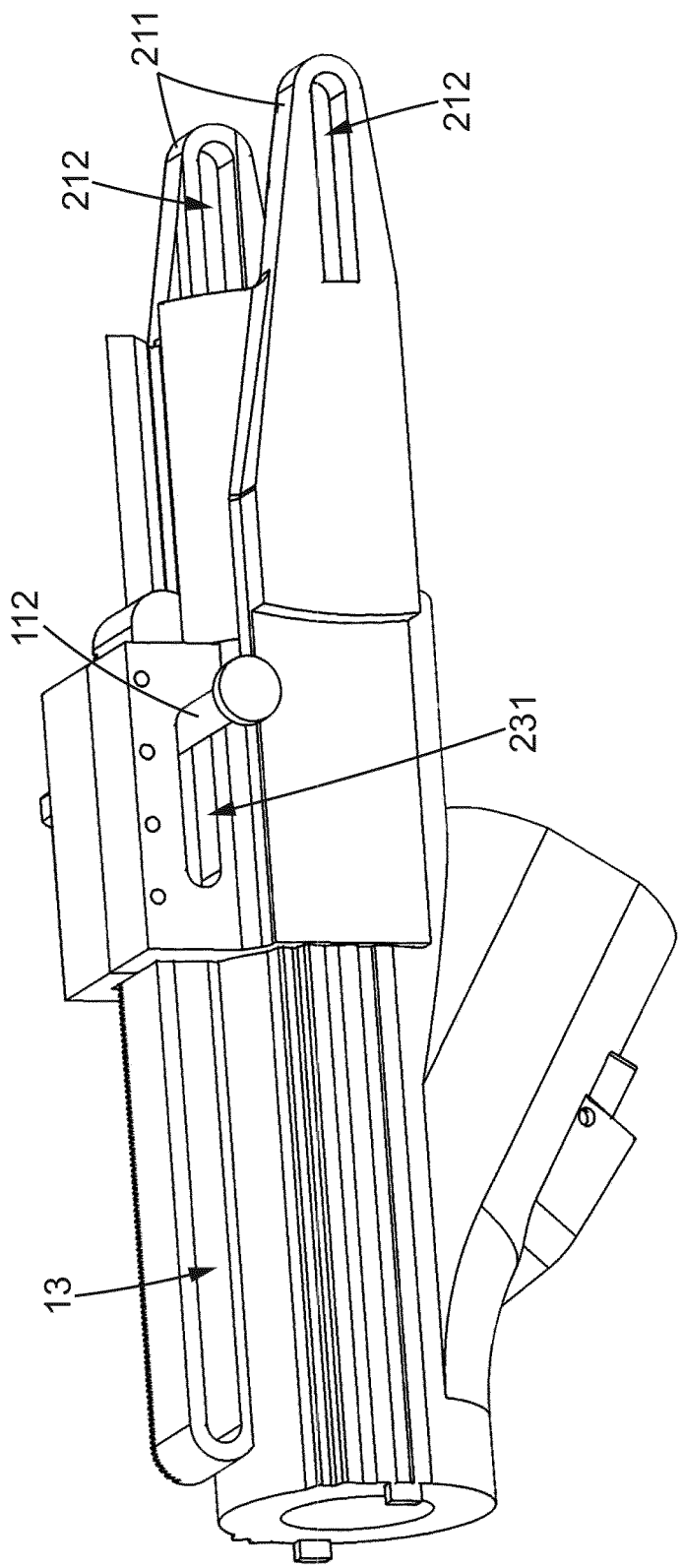
FIGS. 7B-7C show a schematic view of the slots of the main jacket and secondary jacket.
Figure 7C:
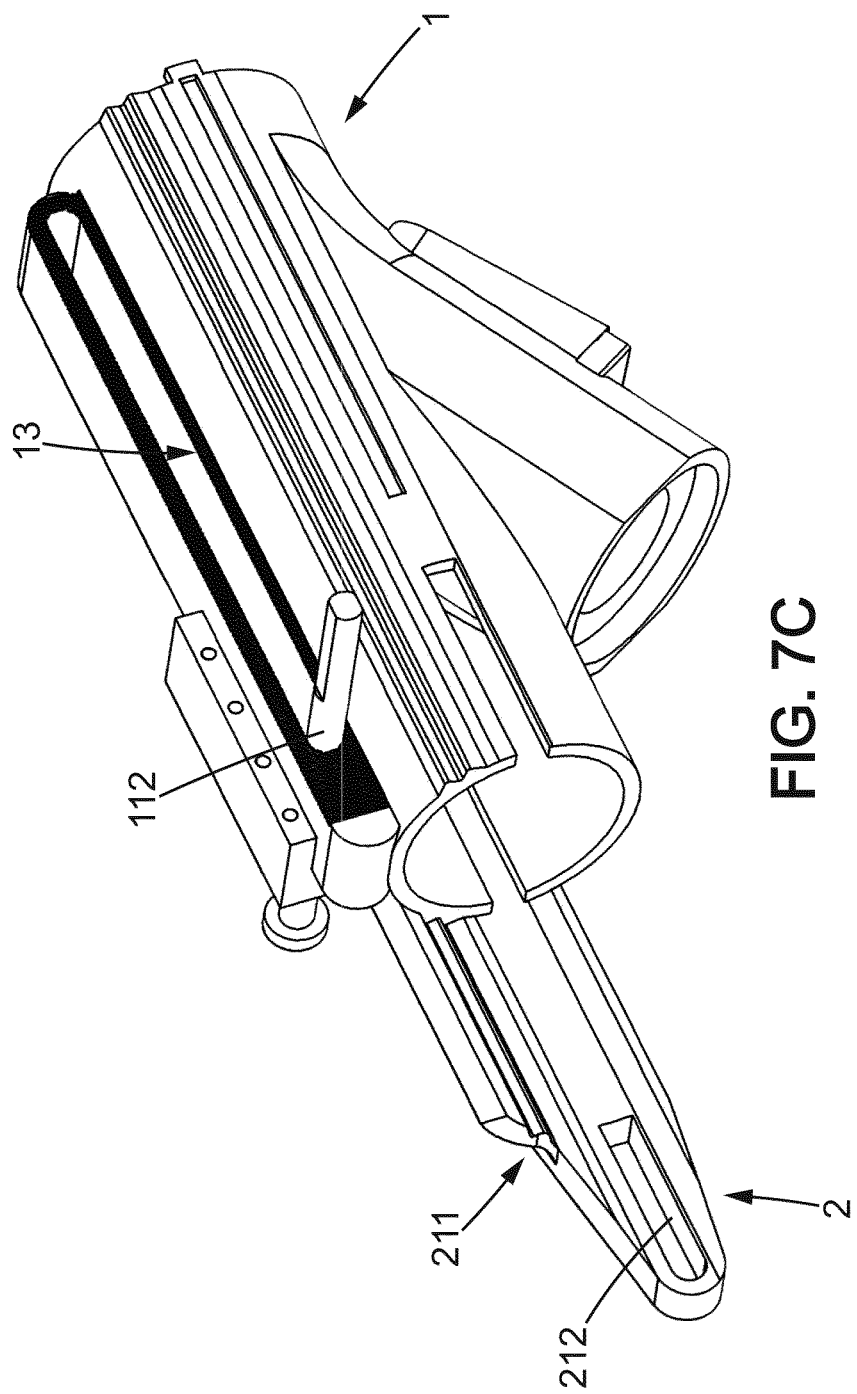

As can be further seen in FIGS. 7A-7C, the secondary jacket 2 further comprises a pair of elongated portions 211 that is configured to protrude out of the housing towards the mount bracket 4 in a direction parallel to the central axis (x). The secondary jacket 2 further comprises a pair of end portion slots 212 located within the respective elongated portions 211. The pair of end portion slots 212 is configured as through holes. Further, the secondary jacket comprises a pair of top portion slots (231, 241) that is configured as through holes. The first top portion slot 231 is located within the first top portion 23, and the second top portion slot 241 is located within the second top portion 24 of the secondary jacket 2.

The end portion slots 212 and the top portion slots (231, 241) can be defined as having a height dimension and a length dimension. The length dimension of the slots (212, 231, 241) can be defined as a dimension along the central axis (x), whereas the height dimension can be defined as a dimension in the vertical direction perpendicular to the central axis (x). The lengths of the slots (212, 231, 241) (along the central axis (x)) further define the maximum available length of the secondary telescopic movement. That is, the length dimensions of the slots (212, 231, 241) may be of about and up to 40 mm.

The lever 111, and more particularly a lever pin 112, is configured to pass through the tilt bracket 3 and the first 231 and second 241 top portion slot. Each of the top portion slots (231, 241) may further define two ends along the central axis (x) along which the top portion slots (231, 241) are movable with respect to the lever pin 112. Having the lever pin 112 at one end of the top portion slots (231, 241) is the corresponding position to the maximum retracted position of the secondary jacket 2 with respect to tilt bracket 3, and having the lever pin 112 at another end of the top portion slots (231, 241) is the corresponding position to the maximum extended position of the secondary jacket 2 with respect to tilt bracket 3.

As shown in FIG. 7A, the tilting pin 34 is provided as protruding through the tilt bracket 3 and the end portion slots 212 in the transverse direction perpendicular to the central axis (x). The tilting pin 34 is also configured to be parallel to the lever pin 112 of the lever 111. As for the pair of top portion slots (231, 241), also the end portion slots 212 may define two ends along the central axis (x) along which the end portion slots 212 are movable with respect to the tilting pin 34. Having the tilting pin 34 at one end of the slots 212, is the corresponding position to the maximum retracted position of the secondary jacket 2 with respect to tilt bracket 3, and having the tilting pin 34 at another end of the slots 212, is the corresponding position to the maximum extended position of the secondary jacket 2 with respect to tilt bracket 3.

The length dimensions along the central axis (x) of the top portion slots (231, 241) and the end portion slots 212 thus define the secondary telescopic movement between the secondary jacket 2 and the tilt bracket 3.

As can be further seen in FIGS. 7A-7C, the lever 111, and more particularly the lever pin 112, is configured to pass tilt bracket 3, the pair of top portion slots (231, 241), and the elongated slot 13 of the main jacket 1. As for the top portion slots (231, 241) and the end portion slots 212, also the elongated slot 13 of the main jacket 1 may define two ends along the central axis (x) along which the elongated slot 13 is movable with respect to the lever pin 112. Having the lever pin 112 at one end of the elongated slot 13, is the corresponding position to the maximum retracted position of the main jacket 1 with respect to the secondary jacket 2, and having the lever pin 112 at another end of the elongated slot 13, is the corresponding position to the maximum extended position of the main jacket 1 with respect to the secondary jacket 2.

The length dimension along the central axis (x) of the elongated slot 13 thus defines the primary telescopic movement between the main jacket 1 and the secondary jacket 2.

Figure 3:
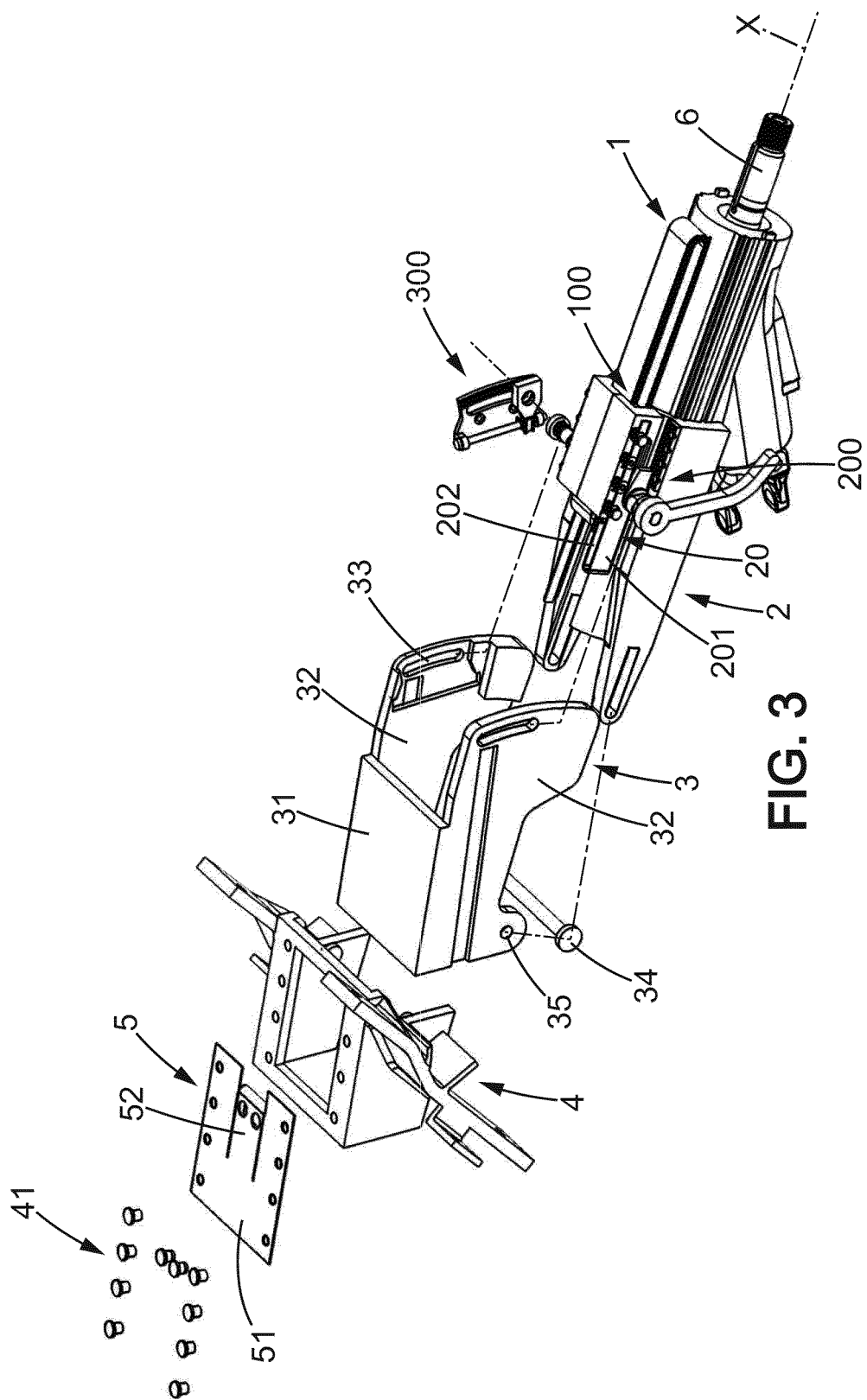
FIG. 3 shows a schematic view of the partially disassembled steering assembly.

As shown in FIGS. 3 and 7A, the tilt bracket 3 further comprises a fixing portion 31 through which the tilt bracket 3 is rigidly fixed to the mount bracket 4, and a pair of side walls 32. In more detail, the mount bracket 4 is rigidly fixed to the fixing portion 31 through a deformable portion 52 of the first tear sheet 5 as will be explained later.

Further, each of the side walls 32 may comprise a tilting slot 33. The tilting slot 33 can be in the form of a thought hole and is configured to accommodate the lever 111 that passes through it. More specifically, the lever pin 112 of the lever 111 is configured to pass through the tilting slot 33.

The tilting slots 33 are configured to have a substantially vertical orientation with respect to the horizontal plane and defines the lower-most position and the upper-most position of the tilt movement of the secondary jacket 2 with respect to the tilt bracket 3.

The tilt bracket 3 may further comprise a guide hole 35 positioned on each of the side walls 32. The guide holes 35 are configured to receive the tilting pin 34. The tilting pin 34 is thus configured to pass through the guide holes 35 of the side walls 32 and the end portion slots 212 of the secondary jacket 2. The tilting pin 34 is thus configured to define a rotational axis of the tilt movement. Consequently, a distance between the tilting pin 34 and the lever pin 112 may define a radius of rotation of the secondary jacket 2, whereas the shape of the tilting slots 33 corresponds to a trajectory of the lever pin 112 when the lever pin 112 is moved from the lower-most position to the upper-most position.

Additionally, the lower-most position of the tilt movement can be thus defined as having the lever pin 112 within the tilting slot 33 at the lowest vertical position with respect to the horizontal plane. And, the upper-most position of the tilt movement can be defined as having the lever pin 112 within the tilting slot 33 at the highest vertical position with respect to the horizontal plane.

Turning to FIGS. 6A-6D, the secondary locking mechanism 200 is to be described. The lever 11 as described above can be further defined as having a handle 113 connected to the rotational lever pin 112. The lever pin 112 is positioned within the steering column in a transverse perpendicular orientation with respect to the central axis (x). That is, an axis of rotation of the lever pin 112 is perpendicular to the central axis (x).

The secondary locking mechanism 200 comprises a lever latch 14 that is rotationally fixed to the lever 111 such that the movement of the lever 111 between the first and second position is configured to be translated to the lever latch 14. More particularly, the lever latch 14 is rotationally fixed to the lever pin 112 such that it is configured to follow the rotation of the lever pin 112.

The lever latch 14 further comprises an engaging member 141 configured to cooperate with a complementary engaging member 213 of the secondary jacket 2. The complementary engaging member 213 is positioned within the secondary jacket 2 at a position corresponding the lever latch 14. As for example shown in FIGS. 6A-6B, the complementary engaging member 213 is positioned within the second block 22 of the secondary jacket 2 so as to face the engaging member 141 of the lever latch 14.

In the first position of the lever 111 corresponding to the locking state of the secondary locking mechanism 200, as shown in FIGS. 2C-2D, the engaging member 141 of the lever latch 14 is configured to be engaged with the complementary engaging member 213 of the secondary jacket 2 to stop the secondary telescopic movement. Consequently, in the second position of the lever 111 corresponding to the release state of the secondary locking mechanism 200 (FIGS. 2A-2B), the engaging member 141 of the lever latch 14 is configured to be disengaged with the complementary engaging member 213 of the secondary jacket 2 to enable the secondary telescopic movement.

In an example, the engaging member 141 of the lever latch 14 and the complementary engaging member 213 of the secondary jacket 2 can be in the form of a plurality of teeth. In addition, the complementary engaging member 213 can be in a form of a plate having a plurality of teeth and can be attached to the secondary jacket 2 by suitable fixing means—such as screws.

As further shown in FIGS. 6B-6E, the tilt locking mechanism 300 may comprise a tilt plate 15 that can be rigidly fixed to the one side wall 32 of the tilt bracket 32. The fixation can be provided by any suitable fixing means, for instance by a pair of screws or rivets. The tilt locking mechanism 300 may further comprise a tilt latch 16 that is configured to slight along the tilt plate 15 in a direction corresponding to the tilt movement.

In more detail, the tilt plate 15 further comprises tilt plate slot 152 and a sliding column 153. The tilt plate slot 152 can be in the form of a thought hole and has a position corresponding to the position of the tilting slot 33 of the tilt bracket 3. The tilt plate slot 152 thus forms the exact same shaped hollow portion of the tilt plate 15 as the tilting slot 33 of the tilt bracket 3. Consequently, the tilt plate slot 152 is configured to have a substantially vertical orientation with respect to the horizontal plane and defines the lower-most position and the upper-most position of the tilt movement. Further, the tilt plate slot 152 is configured to accommodate the lever 111 that passes through it. More specifically, the lever pin 112 of the lever 111 is configured to pass through the tilt plate slot 152 of the tilt plate 15 and the tilting slot 33 of the tilt bracket 3.

The sliding column 153 may be formed as a pin that has an orientation substantially corresponding to the tilt plate slot 152 and provides guidance for the tilt latch 16 when performing the tilt movement. In one example, the tilt latch 16 has a hole adapted to receive the sliding column 153 according to which the tilt latch 16 slides between the lower-most and the upper-most position of the tilt movement. In order to guide the tilt latch 16 between the lower-most and the upper-most position of the tilt movement, the tilt latch 16 comprises a trough hole 162 that is configured to receive the lever 111 and in particular the lever pin 112 of the lever 111.

That is, the lever pin 112 is thus configured to pass through the tilting slot 33, the tilt plate slot 151, and the tilt latch through hole 162. With respect to the complete steering column, the lever 111 and in particular the lever pin 112 is configured to pass the tilting slot 33 of the tilt bracket 3, the pair of top portion slots (231, 241) of the secondary jacket 2, the elongated slot 13 of the main jacket 1, the through hole 162 of the tilt latch 16 and the tilt plate slot 152 of the tilt plate 15.

The tilt latch 16 is further configured to have an engaging member 161 configured to cooperate with a complementary engaging member 151 of the tilt plate 15.

In the first position of the lever 111 corresponding to the locking state of the tilt locking mechanism 300 (FIGS. 2C-2D), the engaging member 161 of the tilt latch 16 is configured to be engaged with the complementary engaging member 151 of the tilt plate 15 to stop the tilt movement. Consequently, in the second position of the lever 111 corresponding to the release state of the tilt locking mechanism 300 (FIGS. 2A-2B), the engaging member 161 of the tilt latch 16 is configured to be disengaged with the complementary engaging member 151 of the tilt plate 15 to enable the tilt movement.

In an example, the engaging member 161 of the tilt latch 16 and the complementary engaging member 151 of the tilt plate 15 can be in the form of a plurality of teeth.

Additionally, the tilt latch 16 is configured to be elastically returned from the release state to the locking state of the tilt locking mechanism 300. More particularly, the tilt latch 16, when transmitted from the locking state to the release state, is configured to rotate about an axis defined by the sliding column 153. The sliding column 153 is thus configured to provide guidance for the tilt latch 16 when performing the tilt movement between the lowest-most and upper-most position, and to provide the axis of rotation when the tilt latch 16 is moved from the locking state into the release state and vice versa. The elastic return of the tilt latch 16 can be provided by an elastic member 163 disposed between the tilt latch 16 and the sliding column 153. As a non-limiting example of the elastic member, a spring 163 can be used.

To move the tilt latch 16 between the locking state into the release state and vice versa, the lever pin 112 of the lever 111 can be provided by a cam member 114. The cam member 114 is configured to move the lever 111 and the lever pin 112 in a direction parallel to the axis of rotation of the lever pin 112. That is, when the lever 111 is moved from the first position to the second position, the rotational movement of the lever 111 directly causes the movement of the lever 111 and its lever pin 112 in the transverse direction perpendicular to the central axis (x) and parallel to the axis of rotation of the lever pin 112.

The cam member 114 can be configured as a two-part member having a plurality of complementary inclined teeth. For instance, the first part of the cam member 114 is positioned within the tilting slot 33 of the tilt bracket 3, and the second part of the cam member 114 is attached to the lever 111. In particular, the first part is configured to move within the tilting slot 33 but is not configured to rotate together with the lever 111. During the rotational movement of the lever 111, the first part of the cam member 114 remains unrotated. On the other hand, the second part of the cam member 114 is configured to rotate together with the lever 111 and the lever pin 112.

Thus, when the lever 111 is rotated about the axis of the lever pin 112, these two parts of the cam member 114 are configured to enlarge a distance between each other and to transmit the transitional movement of the second part of the cam member 114 into the lever pin 112, that is to be moved.

In addition, the transitional movement of the lever pin 112 directly causes the rotational movement of the tilt latch 16. In more detail, when the lever 111 is in the first position, the tilt latch 16 is engaged with the tilt bracket 15 as explained above. When the lever 111 is rotated to the second position, the transitional movement of the lever pin 112 caused by the cam member 114 also moves and rotates the tilt latch 16 so as to be in the disengaged position with respect to the tilt bracket 15 to enable the tilt movement.

The lever 111 can be also elastically returned from the second position to the first position by means of an elastic member 164 positioned between an end of the lever pin 112 and the tilt bracket 5. As a non-limiting example of the elastic member, a coil spring 164 can be used. Therefore, when the lever 111 is rotated from the first position to the second position and consequently is moved in the direction of the axis of the lever pin 112, a tension in the elastic member 164 is created between the lever pin 112 and the tilt bracket 5 such that the elastic member 164 creates a counterforce to move the lever pin 112 back into the initial position corresponding to the first position of the lever 111.

Further, the collapse mechanism of the steering column will be described. As mentioned above, the connection between the tilt bracket 3 and the mount bracket 4 is provided through the first tear sheet 5 and the plurality of bolts 41. As shown in FIGS. 5A-5B and 5D-5E, the first tear sheet 5 comprises a body 51 and a deformable portion 52. The body 51 is fixed to the mount bracket 4 and the deformable portion 52 is fixed to the tilt bracket 3.

Now, a situation where an external force is applied to the steering column will be described. The external force can be understood as the force applied along the central axis (x) to the steering column. For instance, the external force can be initiated by a driver during the frontal impact of a vehicle into an obstacle in a crash event. In such a case, the kinetic energy of the driver is directly transferred to the steering wheel and consequently to the steering column. As can be seen in FIGS. 5D-5E, once the external force is applied, the deformable portion 52 of the first tear sheet 5 is configured to deform along the central axis (x) while the tear sheet remains attached to both the mount bracket 4 and the tilt bracket 3.

It the other words, the tilt bracket 3 is configured to slide within the mount bracket 4 in the direction along and parallel to the central axis (x) as the deformable portion 52 of the first tear sheet 5 deforms. The kinetic energy of the driver is thus absorbed by the first tear sheet 5 and in particular by its deformable portion 52 that is configured to absorb the energy and deform. The slidable movement of the tilt bracket 3 with respect to the mount bracket 4 in case of the applied external force can be defined by a length along the central axis (x) where the length depends on the configuration of the deformable portion 52—as will be described later. As an example, the deformable portion 52 has the capability to be deformed and to provide the slidable movement between the tilt bracket 3 and the mount bracket 4 of about and up to 55 mm.

Advantageously, the tilt bracket 3 and the mount bracket 4 can be provided by a combination of guide rails and guide ways (not shown) to define the exact trajectory of the movement of the tilt bracket 3 within the mount bracket 4.

Figure 5A:
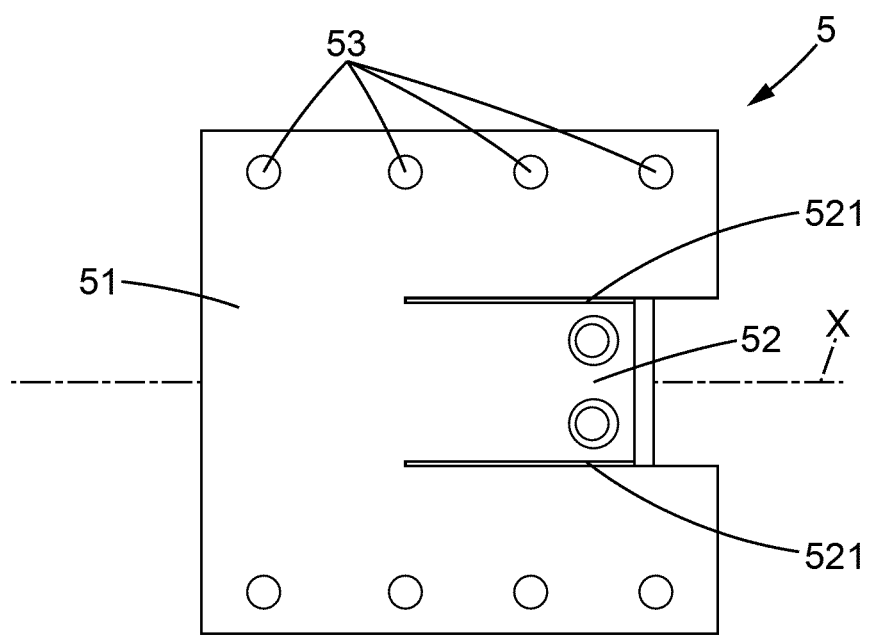
FIG. 5A shows a top view of the first tear sheet.
Figure 5B:
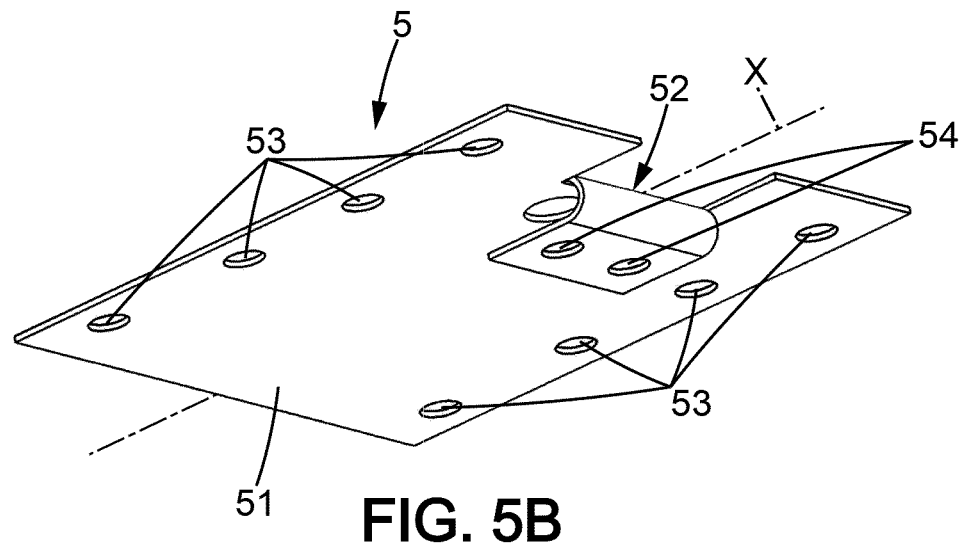
FIG. 5B shows a schematic view of the first tear sheet.
Figure 5C:
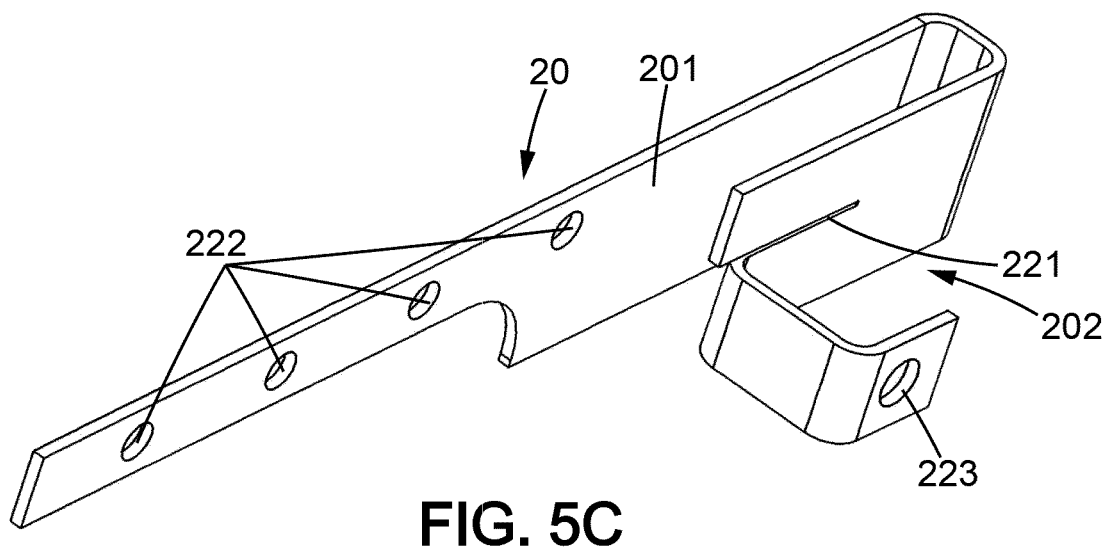
FIG. 5C shows a schematic view of the secondary tear sheet.
Figure 5D:
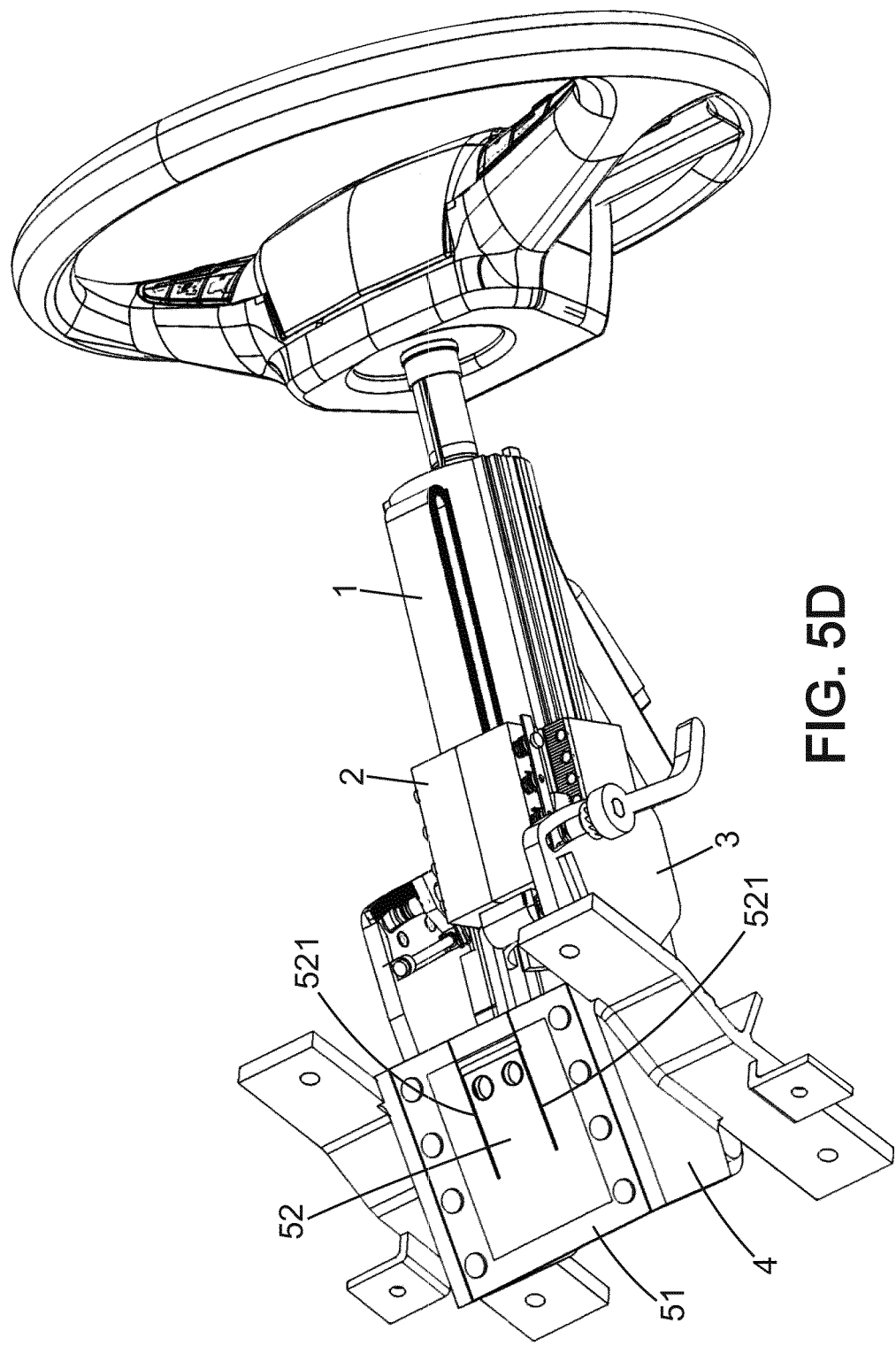
FIG. 5D shows a schematic view of the steering assembly before deformation.
Figure 5E:
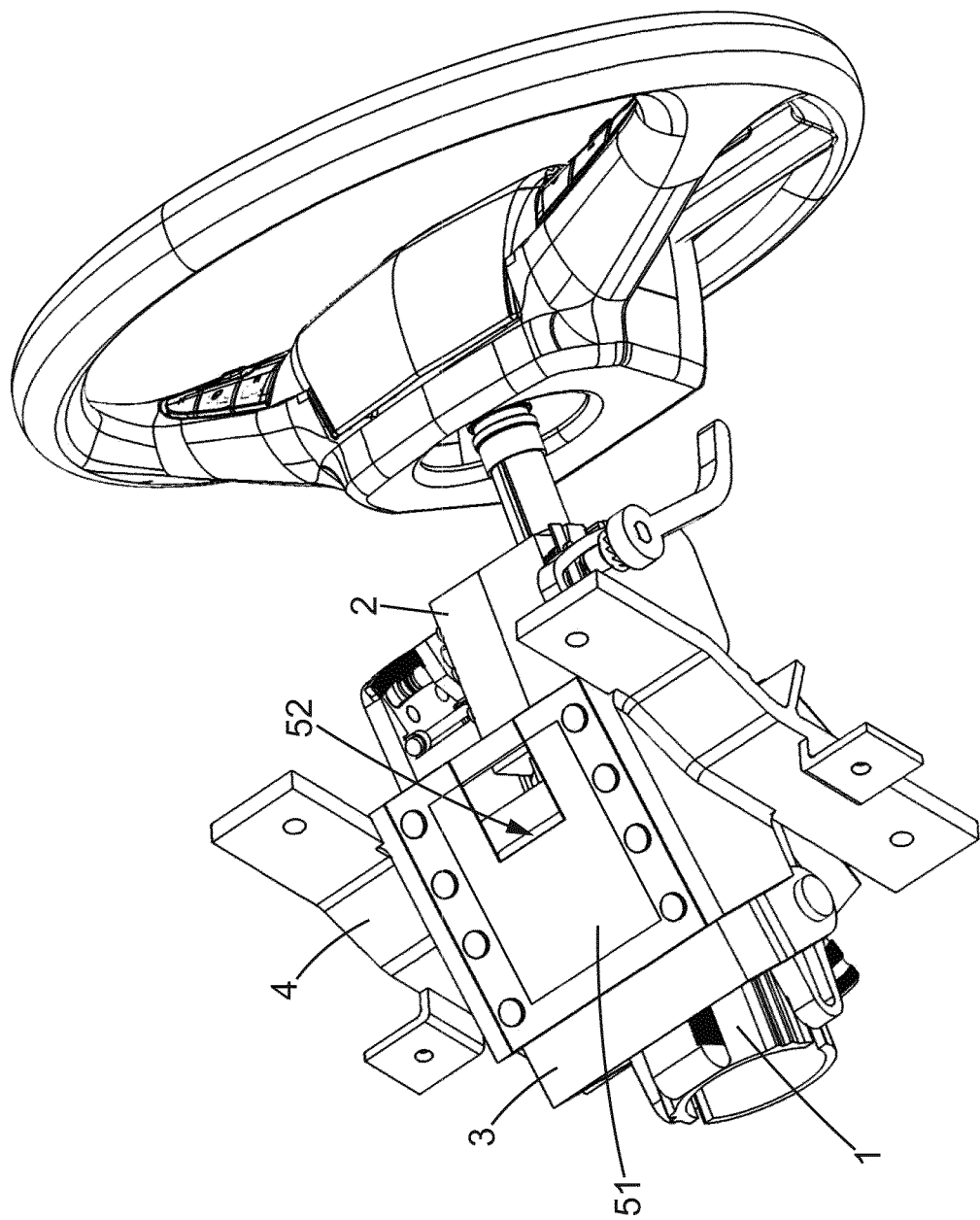
FIG. 5E shows a schematic view of the steering assembly after deformation.

As shown in FIGS. 5A and 5D-5E, the deformable portion 52 of the first tear sheet 5 can be delimited by at least one weakening line 521 extending parallel along the central axis (x). Alternatively, the deformable portion 52 of the first tear sheet 5 can be delimited by two weakening lines 521 extending parallel along the central axis (x). The weakening line 521 can be understood as an area of the tear sheet defined by the line comprising less material compared to the rest of the tear sheet and defines the weakest portion of the first tear sheet 5. For instance, the weakening line 521 can be in a form of a groove or channel. The weakening line 521 defines the area where the deformable portion 52 is configured to partially tear off from the body 51 of the first tear sheet 5. When the external force is applied to the steering column, the weakening line 521 is configured to collapse first and thus define the tearing area of the deformable portion 52 from the body 51 of the first tear sheet 5.

The body 51 of the first tear sheet 5 further comprises a first set of holes 53 configured to receive the plurality of bolts 41 for attaching the first tear sheet 5 to the mount bracket 4. As shown in an example of FIGS. 5A-5B, eight holes 53 are depicted. Other numbers of holes 53 suitable for the stable fixation of the first tear sheet 5 to the mount bracket 4 is possible.

The deformable portion 52 of the first tear sheet 5 comprises a second set of holes 54 configured to receive the plurality of bolts 41 for attaching the first tear sheet 5 to the tilt bracket 3. As shown in an example of FIGS. 5A-5B, two holes 54 are depicted. Other numbers of holes 54 suitable for the stable fixation of the first tear sheet 5 to the tilt bracket 3 is possible.

As can be seen in FIG. 5B, the deformable portion 52 has a U-shaped configuration. An upper part of the U-shaped deformable portion 52 forms a part of the first tear sheet 5 within the same plane as the body 51 of the first tear sheet 5. That is, the upper part of the U-shaped deformable portion 52 forms a planar configuration with the body 51 of the tear sheet 5. A lower part of the U-shaped deformable portion 52 forms a free end and is located below the planar body 51 of the first tear sheet 5. The second set of holes 54 is located within the lower part of the U-shaped deformable portion 52, whereas the holes 54 are accessible through the upper part of the U-shaped configuration having holes with a larger diameter compared to the second set of holes 54 of the lower part of the U-shaped configuration.

As shown in FIG. 3, the main locking mechanism 100 may further comprise a secondary tear sheet 20. The secondary tear sheet 20 has a body 201 and a deformable portion 202. The body 201 is configured to the fixed to the secondary jacket 2 and the deformable portion 202 is configured to be fixed to the main jacket 1.

Figure 5F:
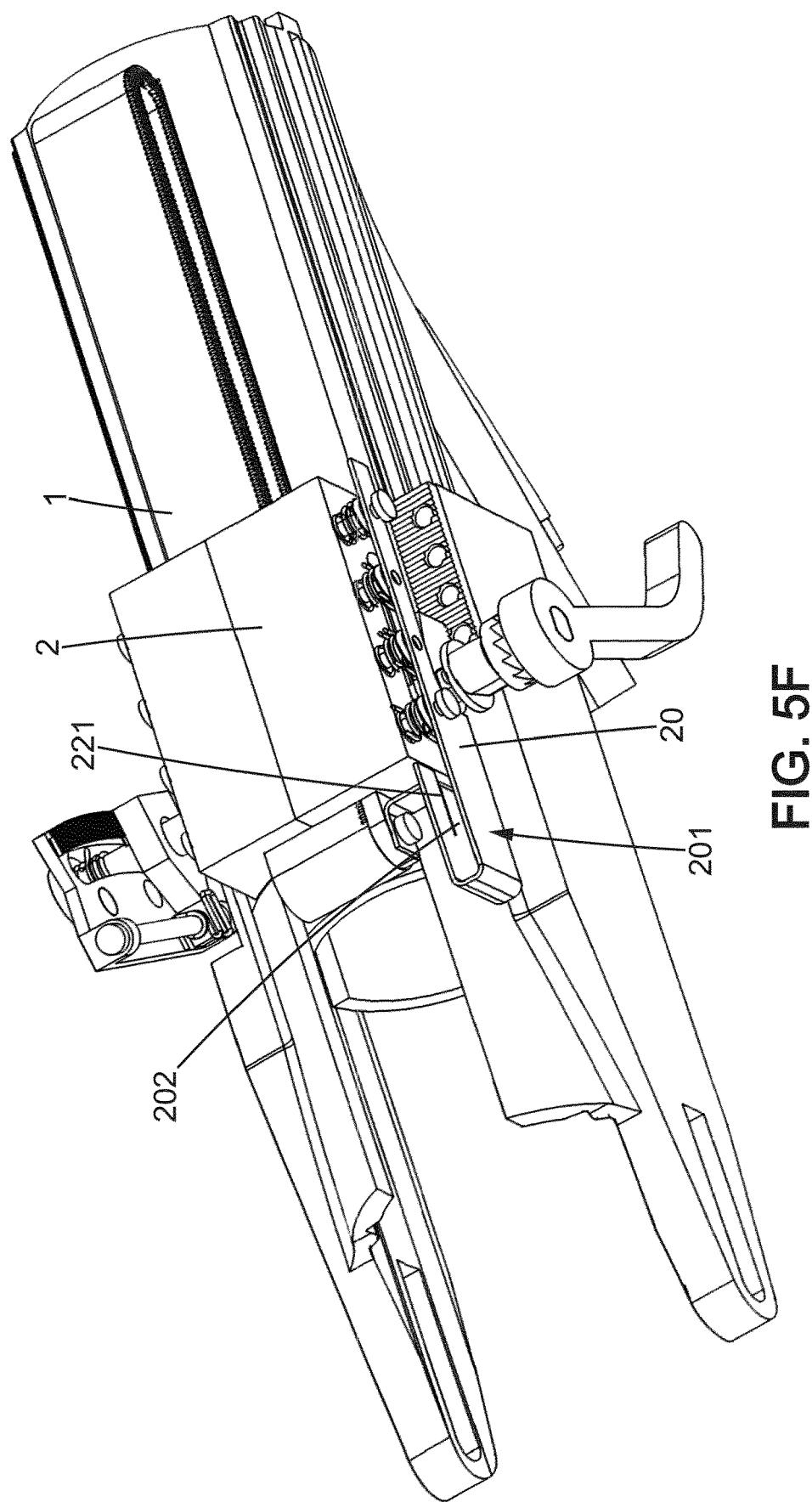
FIG. 5F shows a schematic view of the secondary tear sheet before deformation.
Figure 5G:
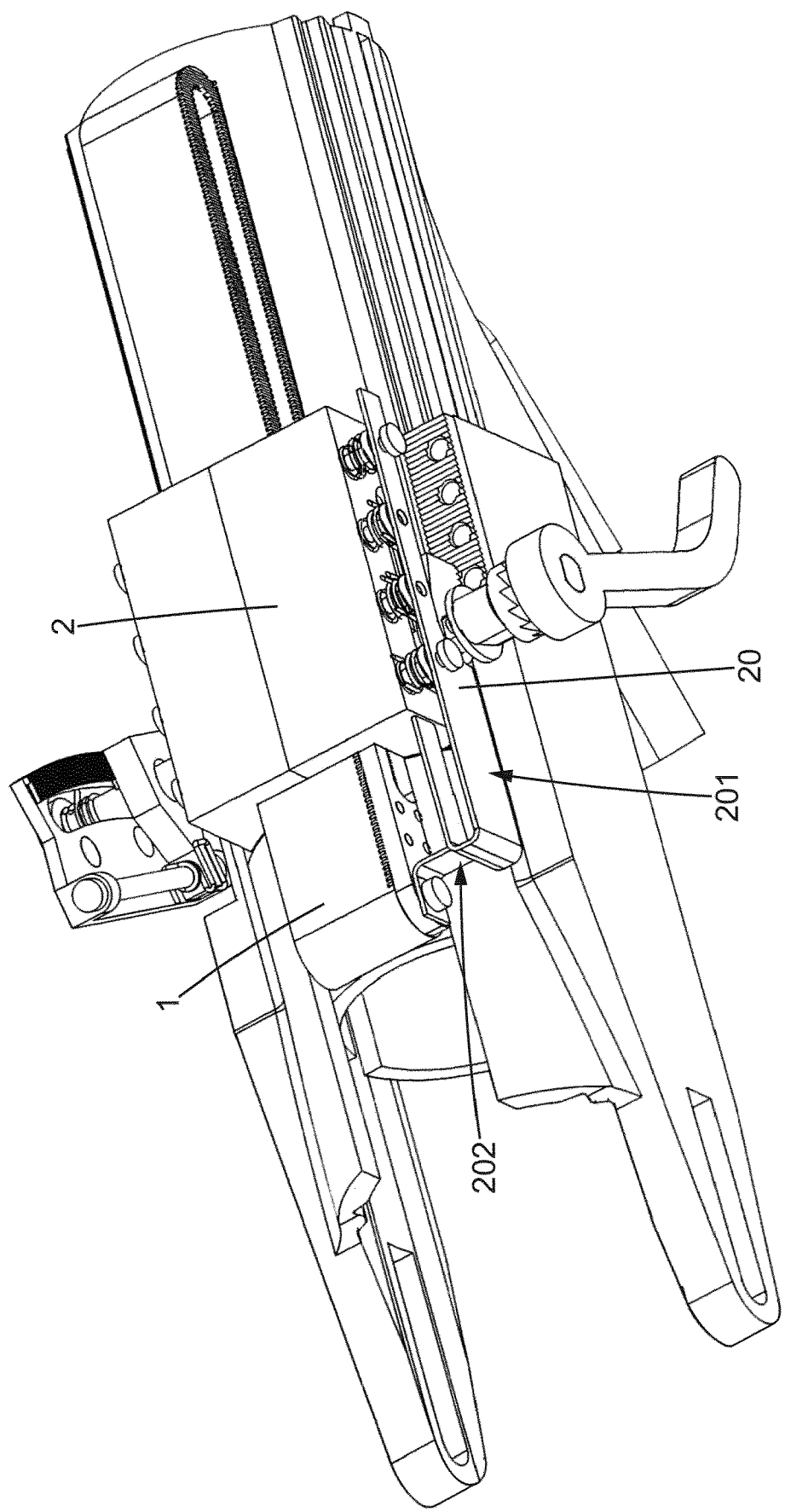
FIG. 5G shows a schematic view of the secondary tear sheet after deformation.
Figure 6A:
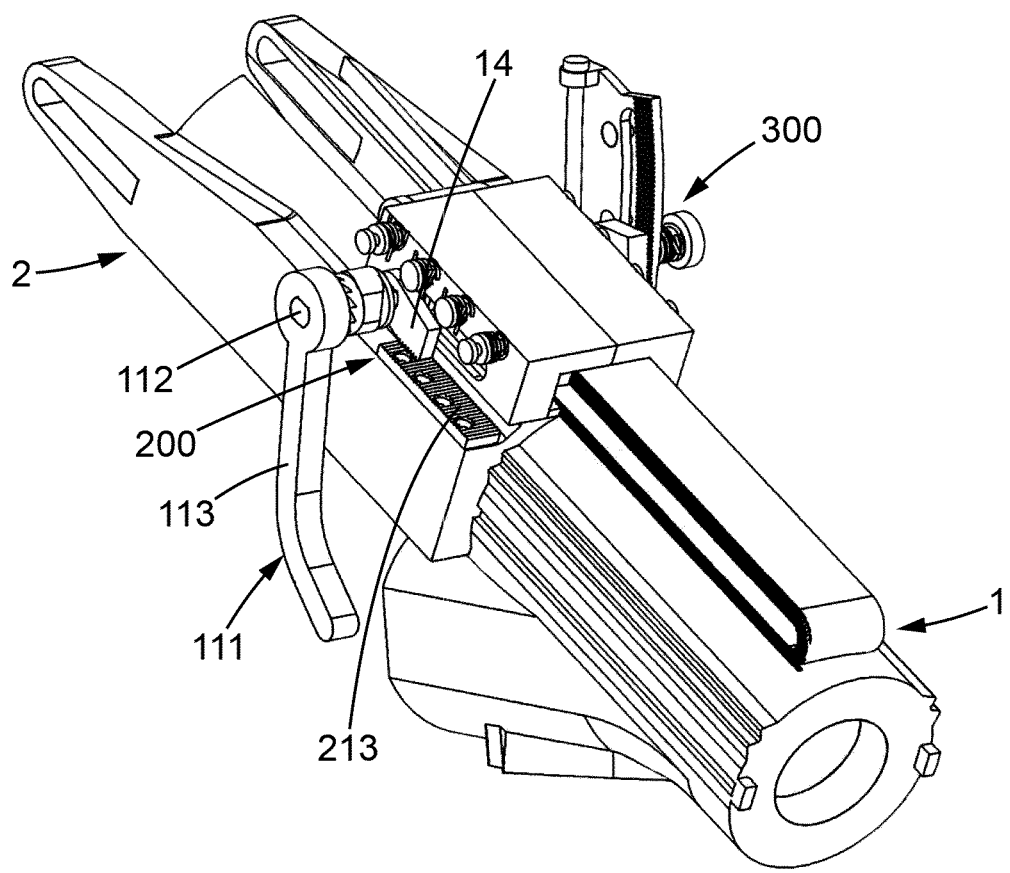
FIG. 6A shows a schematic view of the main jacket withing the secondary jacket.
Figure 6B:
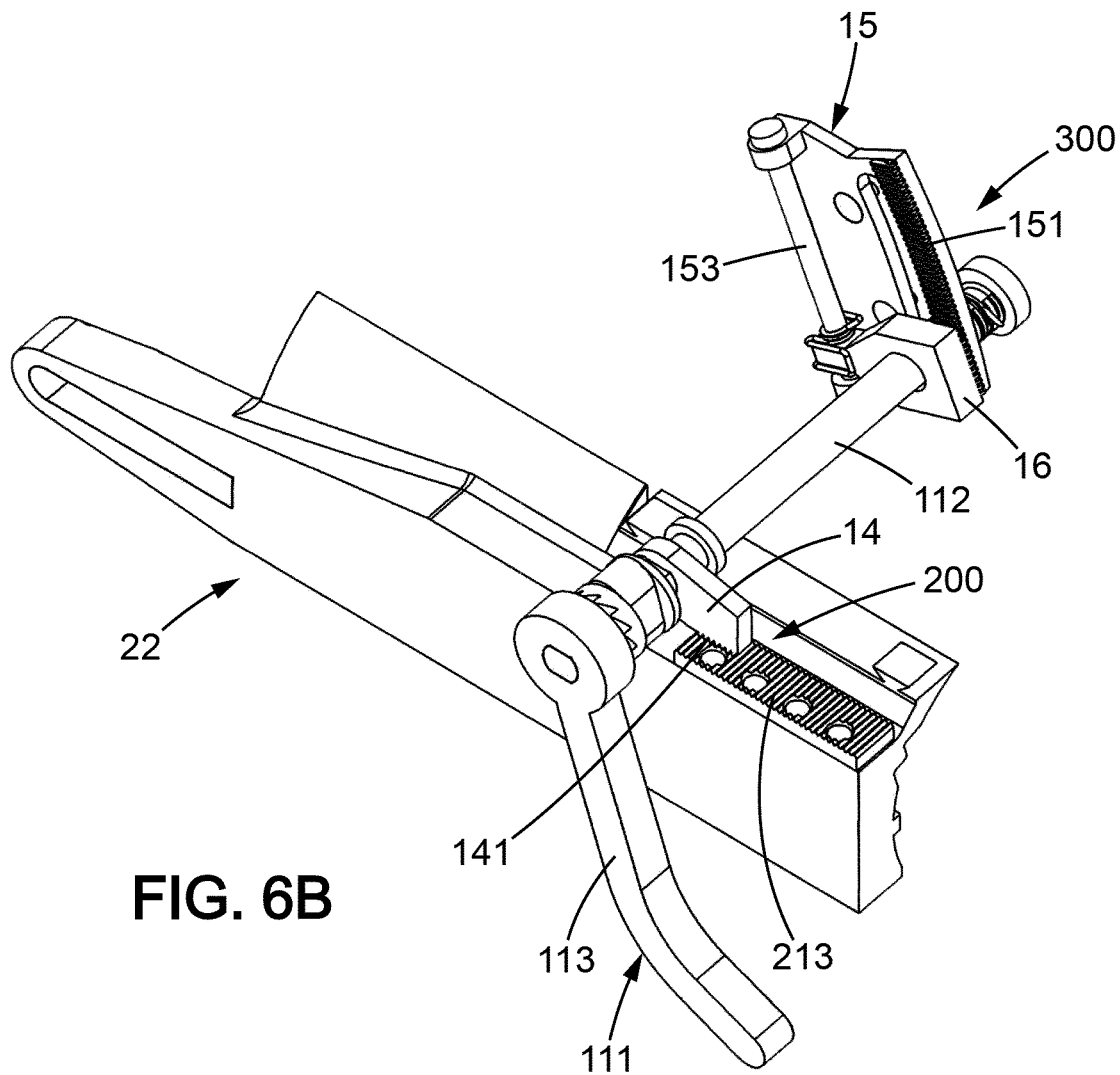
FIGS. 6B-6D show a detailed view of the secondary locking mechanism and the tilt locking mechanism.
Figure 6C:
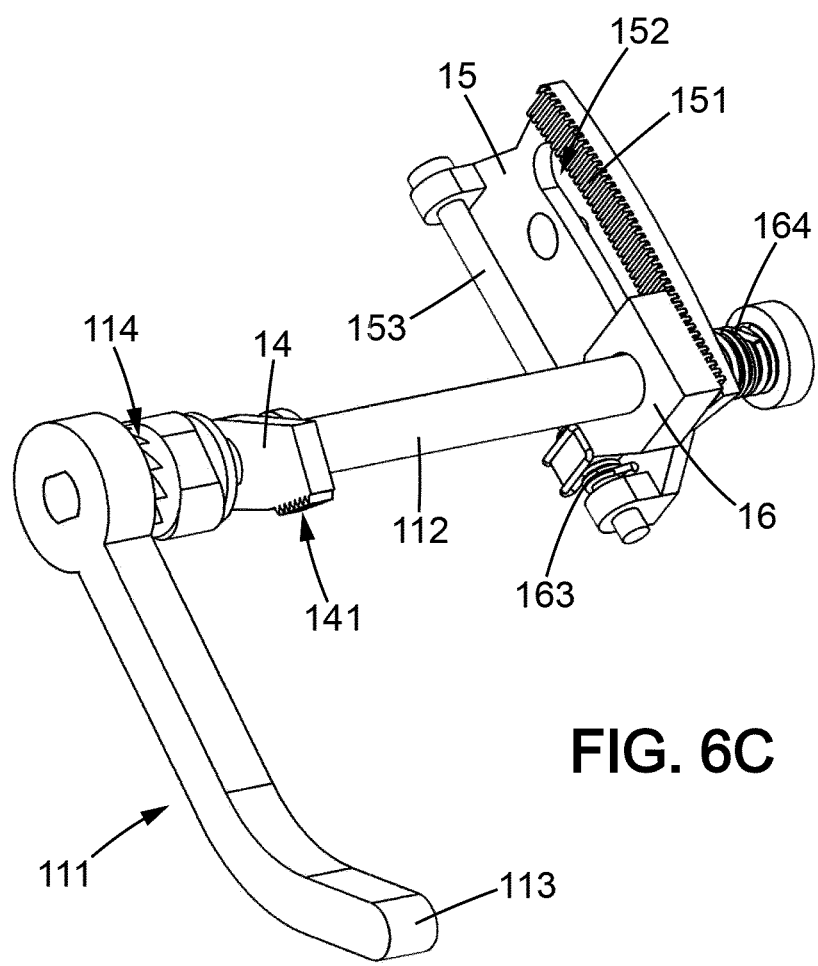
Figure 6D:
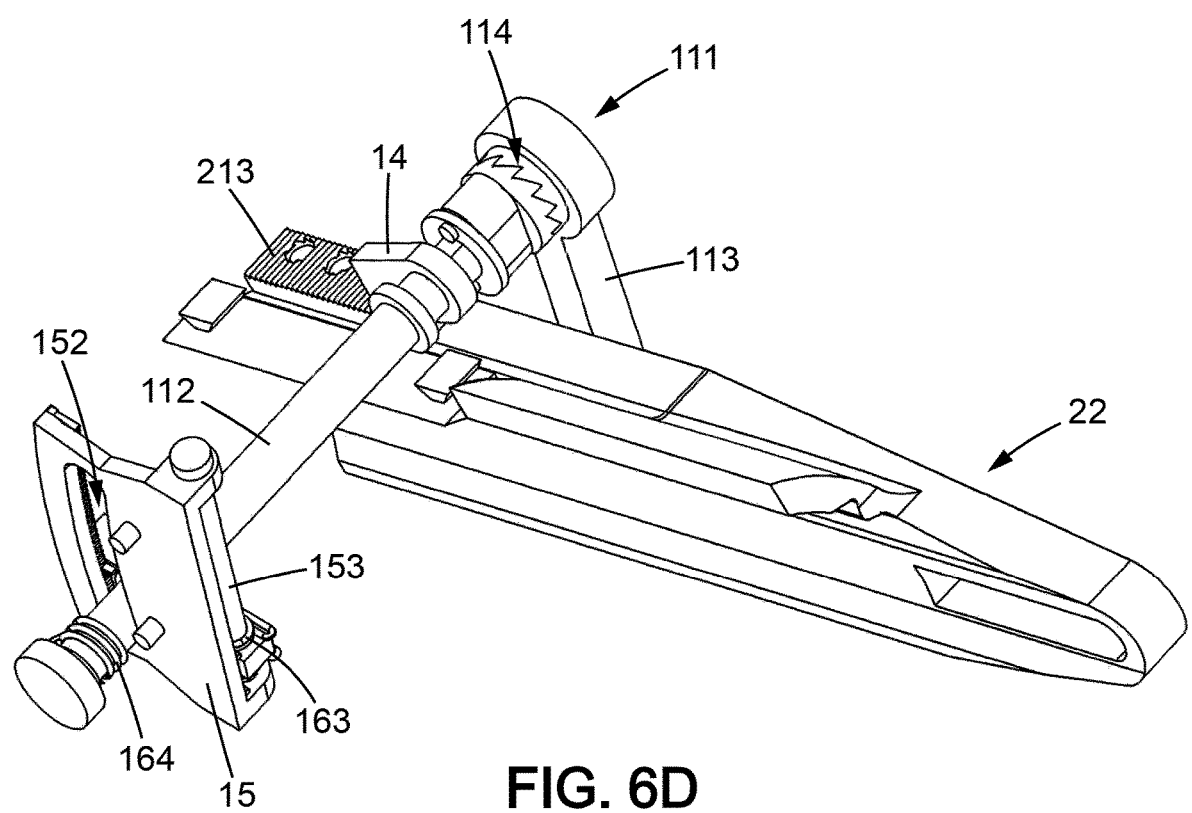
Figure 6E:
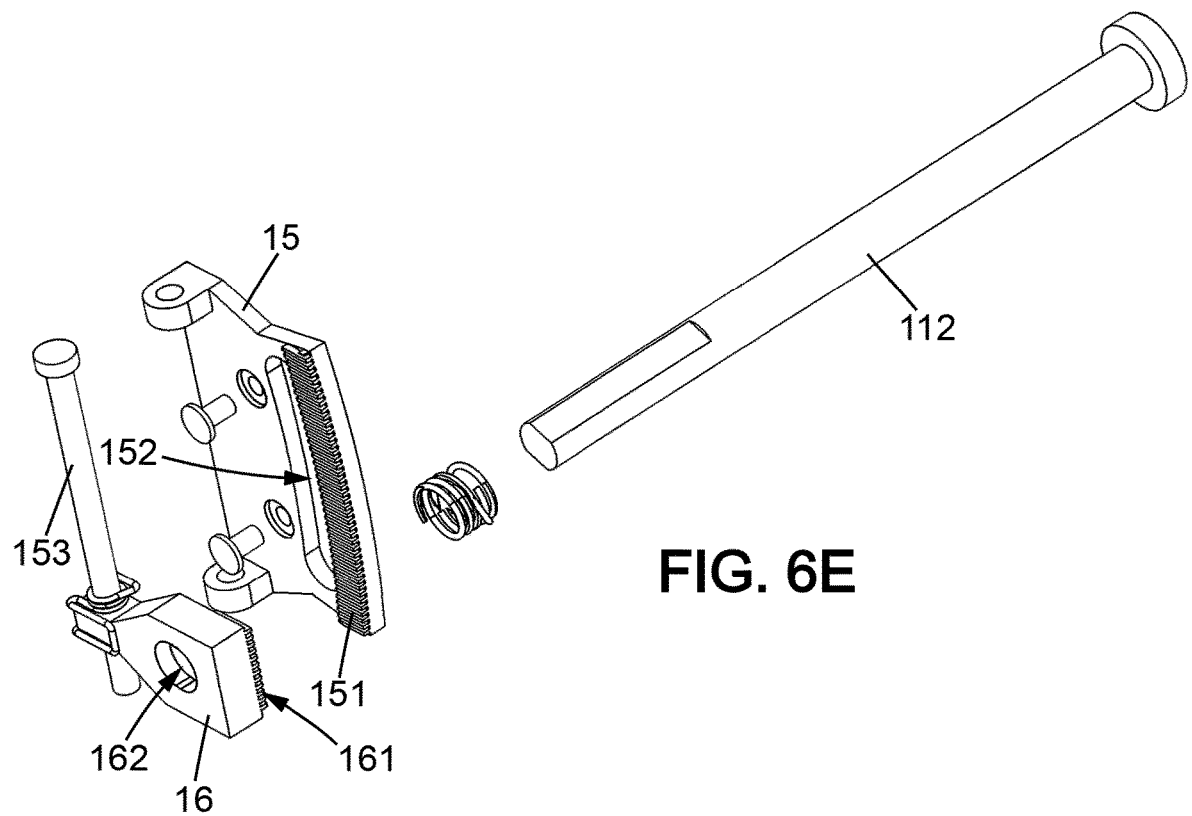
FIG. 6E shows a schematic view of the tilt locking mechanism.

Now, as shown in FIGS. 5F-5G, a situation where the external force is applied to the steering column will be described. The external force can be understood as the force explained before with respect to the first tear sheet 5. That is, once the external force is applied, the deformable portion 202 of the secondary tear sheet 20 is configured to deform along the central axis (x) while the tear sheet 20 remains attached to both the main jacket 1 and the secondary jacket 2.

It the other words, the main jacket 1 is configured to slide within the secondary jacket 2 in the direction along and parallel to the central axis (x) as the deformable portion 202 of the secondary tear sheet 20 deforms. The kinetic energy of the driver is thus absorbed by the secondary tear sheet 20 and in particular by its deformable portion 202 that is configured to absorb the energy and deform. The slidable movement of the main jacket 1 with respect to the secondary jacket 2 in case of the applied external force can be defined by a length along the central axis (x) where the length depends on the configuration of the deformable portion 202—as will be described later. As an example, the deformable portion 202 of the secondary tear sheet 20 has the capability to be deformed and to provide the slidable movement between the main jacket 1 and the secondary jacket 2 of about and up to 150 mm.

As shown in FIGS. 5C and 5F-5G, the deformable portion 202 of the secondary tear sheet 20 can be delimited by at least one weakening line 221 extending parallel along the central axis (x). The weakening line 221 can be understood as an area of the tear sheet defined by the line comprising less material compared to the rest of the tear sheet and defines the weakest portion of the secondary tear sheet 20. For instance, the weakening line 221 can be in a form of a groove or channel. The weakening line 221 defines the area where the deformable portion 202 is configured to partially tear off from the body 201 of the secondary tear sheet 20. When the external force is applied to the steering column, the weakening line 221 is configured to collapse first and thus define the tearing area of the deformable portion 202 from the body 201 of the secondary tear sheet 20.

The body 201 of the secondary tear sheet 20 further comprises a first set of holes 222 configured to receive a plurality of bolts 29 for attaching the secondary tear sheet 20 to the secondary jacket 2. As shown in an example of FIG. 5C, four holes 222 are depicted. Other numbers of holes 222 suitable for the stable fixation of the secondary tear sheet 20 to the secondary jacket 2 is possible.

The deformable portion 202 of the secondary tear sheet 20 comprises a second hole 223 configured to receive a bolt 28 for attaching the secondary tear sheet 20 to the main jacket 1.

As can be seen in FIG. 5C, the secondary tear sheet 20 is defined by an S-shaped configuration or more particularly, by a double U-shaped configuration. A middle part of the S-shaped secondary tear sheet 20 forms a transmitting area between the body 201 and the deformable portion 202. For instance, the first U-shape is defined by the body 201 and the second U-shape is defined by the deformable portion 202 to form the S-shaped configuration of the secondary tear sheet 20.

The S-shaped configuration is defined in a transverse direction perpendicular to the central axis (x). Consequently, the two U-shaped parts are defined in a transverse direction perpendicular to the central axis (x). That is, contrary to the upper and lower part of the U-shaped configuration of the first tear sheet 5 defined above, the U-shaped configuration of the deformable portion 202 defines an inner part and an outer part of the U-shaped configuration. The inner part is located closer to the central axis (x) and the outer part is located remotely to the central axis (x) as compared to the inner part.

The inner part of the U-shaped deformable portion 202 forms a free end and the second hole 223 is located within the inner part of the U-shaped deformable portion 202.

The capability of the steering column described herewith is to provide a combined collapse movement of the first and secondary tear sheets (5, 20) that is a combination of the collapse/deformable movement of the deformable portion 52 of the first tear sheet 5 and the collapse/deformable movement of the deformable portion 202 of the secondary tear sheet 20. This combination of two tear sheets is to be understood as the previously referred dual-collapse mechanism and an example of the deformation of both tear sheets (5, 20) is shown in FIGS. 5D-5E. The total length available for the combined collapse movement is for instance of about and up to 205 mm. The length of the combined collapse movement is to be understood as a distance between an initial position of the steering column before the external force is applied and the maximum available deformation of both the first and secondary tear sheets (5, 20) after the external force is applied.

Also, the maximum available length of the dual-collapse mechanism is dependent upon the configuration of the primary telescopic movement—e.g. whether the main jacket 1 is positioned in the fully retracted position with respect to the secondary jacket 2 or the main jacket 1 is positioned in the fully extended position with respect to the secondary jacket 2.

That is, the deformable movement of the first tear sheet 5 of about and up to 55 mm is always available in any configuration of the steering column, whereas the deformable movement of the secondary tear sheet 20 can vary between 0-150 mm depending on the position of the main jacket 1 with respect to the secondary jacket 2. As an example, in case of the main jacket 1 is in the fully extended position with respect to the secondary jacket 2 (as shown in FIG. 5D), the deformable movement of the secondary tear sheet 20 is of about and up to 150 mm. In case of the main jacket 1 is in the fully retracted position with respect to the secondary jacket 2, the deformable movement of the secondary tear sheet 20 is delimited to 0 mm.

The combined collapse movement of the first and secondary tear sheets (5, 20) can be thus variable between 55-205 mm.

Alternatively, the steering column can be utilized only with the first tear sheet 5. The available collapse movement of this embodiment would be thus always of about and up to 55 mm. In this embodiment, the secondary tear sheet 20 can be present in the same position as described above but manufactured from a very high stiffness material that would transfer the kinetic energy to the first tear sheet 5 without collapsing the secondary tear sheet 20. Alternatively, the secondary tear sheet 20 can be fully omitted. Such configuration of the steering column is known as the single-collapse mechanism.

Furthermore, in respect to the deformation of the secondary tear sheet 20, the body 201 of the secondary tear sheet 20 is configured to be fixed to the secondary jacket 2 and the deformable portion 202 is configured to be fixed to the main jacket 1. In particular, the body 201 of the secondary tear sheet 20 is configured to be attached to the slider block 26 and the deformable portion 202 is configured to be attached to the engaging block 25 that is to be securely engaged with the main jacket 1 through the engaging member 251 and the complementary engaging member 11. More particularly, the body 201 of the secondary tear sheet 20 is attached to the slider block 26 through the plurality of bolts 29, and the deformable portion 202 of the secondary tear sheet 20 is configured to be attached to the engaging block 25 through the bolt 28.

As previously mentioned, the slider block 26 and the engaging block 25 of the secondary jacket 2 may be attached through the breakable connection. The breakable connection may be for instance, in the form of a plurality of pins 27 or in the form of injected resin. The slider block 26 and the engaging block 25 comprise a plurality of holes adapted to receive either the plurality of pins 27 or being adapted to receive the injected resin. Furthermore, the pins 27 can be made of a resin material or can be in the form of shear pins. All examples of the breakable connection are configured to break under a certain level of pressure, as shown in the example of FIGS. 5F-5G. The certain level of pressure can be understood as a predetermined value of the pressure suitable to absorb the kinetic energy of the driver and to break, to avoid any unnecessary injury. As an example, the predetermined level of the pressure under which the breakable connection is configured to break can be 2 kN.

Thanks to this configuration, when the steering column is exposed to the external force that exceeds a predetermined level of pressure in the direction substantially parallel to the central axis (x), the breakable connection is configured to break such that the main jacket 1 engaged to the engaging block 25 and the deformable portion 202 of the secondary tear sheet 20 are configured to move along the central axis (x) direction with respect to the secondary jacket 2 (FIG. 5G). In the other words, the movement of the main jacket 1, engaging block 25, and the deformable portion 202 is defined by the tearing of the deformable portion 202 from the body 201 of the secondary tear sheet 20 in the direction parallel to the central axis (x).

Alternatively, in the embodiment where only the first tear sheet 5 is utilized, the breakable connection is replaced with the rigid connection that does not enable to break under the certain level of pressure.

The examples of different collapse lengths are described in Table 1 below. The examples are related to the exemplary steering column with both the first and secondary tear sheets (5, 20) implemented therein. That is, the examples shown in Table 1 relate to the implementation of the dual-collapse mechanism within the tested steering column.

Furthermore, for the exemplary tests of the collapse lengths, the standardized sizes of the anthropometric test dummies (ATD) have been used. The person skilled in the art would clearly recognize the terminology used herewith. As can be seen in Table 1 below, the standardized $5^{th}$-percentile female dummies (F05) have been used in tested examples 1-3, 50th percentile male dummies (M50) have been used in tested examples 4-9, $97.5^{th}$ percentile male dummies (M97.5) have been used in tested examples 10-12, and $99^{th}$ percentile male dummies (M99) have been used in tested examples 13-15. Also, the person skilled in the art would clearly recognize the terminology "High BMI" used with respect to the anthropometric test dummies. The BMI is a generally known term recognizing the Body Mass Index. The "High BMI", as used in the tested examples 4-6, simulates conditions of having a person/driver with a high BMI (overweight, obese person) compared to the standardized body weight of a person of the same size.

Besides, the anthropometric test dummies (ATD) have been tested in a different seating position that is, in general, dependent on the seat position variation with respect to the vertical axis. For instance, the term "Low Position" represents an example of the lowest available seating position of the anthropometric test dummy within the seat with respect to the steering column. The term "High Position" represents an example of the highest available seating position of the anthropometric test dummy within the seat with respect to the steering column. In addition, the term "Mid Position" represents an example of the substantially middle seating position of the anthropometric test dummy within the seat with respect to the steering column, which is substantially in the middle and between the "High Position" and the "Low Position".

The process of testing has been set as follows. Firstly, an appropriate anthropometric test dummy (F05, M50 High BMI, M50, M97.6, M99) has been chosen and positioned within the seat at a set position height (Low, Mid, or High Position). Secondly, the anthropometric test dummy has been exposed to the predetermined level of force that is to be transferred from the anthropometric test dummy to the steering wheel of the steering column. The predetermined force was set to about 2 kN. Once the simulation of the force applied to the dummy had been finished, the investigation of the deformation of the first and second tear sheets (5, 20) has been performed.

TABLE 1

| Example No. | ATD size & position | Collapse length of the secondary tear sheet 20 [mm] | Collapse length of the first tear sheet 5 [mm] | Total collapse length [mm] |
|---|---|---|---|---|
| 1 | F05 High Position | 0 | 55 | 55 |
| 2 | F05 Mid Position | 0 | 55 | 55 |
| 3 | F05 Low Position | 0 | 55 | 55 |
| 4 | M50 High BMI High Position | 0 | 55 | 55 |
| 5 | M50 High BMI Mid Position | 21 | 55 | 76 |
| 6 | M50 High BMI Low Position | 49 | 55 | 104 |
| 7 | M50 High Position | 8 | 55 | 63 |
| 8 | M50 Mid Position | 40 | 55 | 95 |
| 9 | M50 Low Position | 87 | 55 | 142 |
| 10 | M97.5 High Position | 25 | 55 | 80 |
| 11 | M97.5 Mid Position | 69 | 55 | 124 |
| 12 | M97.5 Low Position | 96 | 55 | 151 |
| 13 | M99 High Position | 69 | 55 | 124 |
| 14 | M99 Mid Position | 100 | 55 | 155 |
| 15 | M99 Low Position | 149 | 55 | 204 |

As can be seen in Table 1, the tested examples 1-4 show that the secondary tear sheet 20 has not been deformed during the simulation process and the first tear sheet 5 has been completely deformed with respect to its available collapse length of 55 mm. That is, the exemplary tested examples 1-4 show that during an impact, the first tear sheet 5 is to be deformed first, and if the force is not completely absorbed by the first tear sheet 5, the secondary tear sheet 20 starts to collapse.

The deformation of the secondary tear sheet 20 can be seen in tested examples 5-15. Comparing the tested examples 4, 5, and 6, incorporating the same size of the anthropometric test dummy (M50 High BMI), it can be seen that the seating position of the anthropometric test dummy has a direct consequence on the deformation of the steering column. Please note the height of the seat can be compensated by adjusting the position of the steering column itself—the position of the steering column set by means of the telescopic and tilt movement has also a direct consequence on the deformation of the steering column While the tested example 4 provides the deformation of the first tear sheet 5 only in the high seated position, the tested examples 5-6 provide the deformation of both the first and second tear sheets (5, 20). In these two examples (5-6), the anthropometric test dummy has been positioned in the middle and low positions. That is, in tested examples 5 and 6, the lower seated position of the dummy caused more deformation of the steering column as compared to the high seated position of the same dummy of the tested example 4.

As can be further seen in Table 1, the tested dual-collapse mechanism implemented within the steering column provides two deformation zones provided by the first and secondary tear sheets (5, 20) such that the total collapse length can be up to 205 mm, as explained earlier. Furthermore, the position of a driver with respect to the steering column in terms of adjustment of the steering column in an appropriate position and/or in terms of seat position has direct consequence to the force absorbed by the steering column and by the tear sheets (5, 20). Therefore, when the steering column is provided with the first tear sheet 5 only, or also with the secondary tear sheet 20, it is important to also have the capabilities to set the desired steering column position by the telescopic movement (first and second) and the tilt movement. The combination of the tilt/telescopic mechanism together with the dual-collapse mechanism provides an enhanced steering column where the position of the steering wheel attached there onto can be properly adjusted to suit a different kind of driver anthropometry, whereas the adjustment of the inclination and longitudinal position of the steering column further helps to effectively transform the kinetic energy of a driver into the steering wheel/column in case of a crash event. Thus, having the collapsible steering column without a high level of variability in terms of adjustment in vertical/longitudinal direction (to correctly adjust the steering column with respect to the driver position), may not be beneficial in case of crash events.

The invention claimed is:

1. A steering column for a vehicle comprising:
a main jacket having a steering input shaft having a central axis, and a secondary jacket, the main jacket being in slidable contact with the secondary jacket defining a primary telescopic movement of the steering column;
a mount bracket configured to be attached to the vehicle;
a tilt bracket being rigidly connected to the mount bracket with a first tear sheet;
wherein the secondary jacket is pivotally adjustable within the tilt bracket so as to define a tilt movement of the steering column, and the secondary jacket is in slidable contact with the tilt bracket so as to define a secondary telescopic movement;
a tilt locking mechanism configured to enable the tilt movement of the secondary jacket together with the main jacket with respect to the tilt bracket when the tilt locking mechanism is in a release state, and stop the tilt movement of the secondary jacket together with the main jacket with respect to the tilt bracket when the tilt locking mechanism is in a locking state;
a telescopic lock comprising:
a main locking mechanism configured to enable the primary telescopic movement between the main jacket and the secondary jacket when the main locking mechanism is in a release state, and stop the primary telescopic movement between the main jacket and the secondary jacket when the main locking mechanism is in a locking state; and
a secondary locking mechanism configured to enable the secondary telescopic movement between the secondary jacket and the tilt bracket when the secondary locking mechanism is in a release state, and stop the secondary telescopic movement between the secondary jacket and the tilt bracket when the secondary locking mechanism is in a locking state; and
a lever being coupled to the tilt locking mechanism and the telescopic lock, the lever being configured to be positioned at least in a first position and a second position, wherein:
in the first position of the lever, the tilt locking mechanism, the main locking mechanism and the secondary locking mechanism are configured to be in the locking state, and
in the second position of the lever, the tilt locking mechanism, the main locking mechanism and the secondary locking mechanism are configured to be in the release state;
wherein the first tear sheet comprises a body fixed to the mount bracket and a deformable portion fixed to the tilt bracket, the deformable portion being configured to deform along the central axis direction in case of the steering column is exposed to an external force along the central axis; and
wherein the main locking mechanism comprises a secondary tear sheet having a body being fixed to the secondary jacket and a deformable portion fixed to the main jacket, the deformable portion being configured to deform along the central axis direction in case of the steering column is exposed to the external force.

2. The steering column of claim 1, wherein the deformable portion of each of the first and the second tear sheets is delimited by at least one weakening line extending parallel along the central axis so as to be to be at least partially torn off from the body when the steering column is exposed to the external force.

3. The steering column of claim 1, wherein the secondary jacket comprises:
a first block and a second block configured to define a housing receiving the main jacket;
wherein the main locking mechanism comprises a first top portion rigidly attached to the first block, and a second top portion;
wherein the second top portion is movable with respect to the first top portion in a transverse direction perpendicular to the central axis so that in the release state of the main locking mechanism, the second top portion is disengaged from the main jacket, and in the locking state of the main locking mechanism, the second top portion engages the main jacket; and
wherein the second top portion is elastically returned to the locking state.

4. The steering column of claim 3, wherein the second top portion comprises an engaging block attached to the deformable portion of the secondary tear sheet and provided with an engaging member configured to cooperate with a complementary engaging member of the main jacket such that:
in the locking state of the main locking mechanism, the engaging member is configured to be engaged with the complementary engaging member of the main jacket; and
in the release state of the main locking mechanism, the engaging member is configured to be disengaged with the complementary engaging member of the main jacket.

5. The steering column of claim 4, wherein the second top portion further comprises a slider block to which the engaging block is attached through a breakable connection.

6. The steering column of claim 5, wherein when the steering column is exposed to the external force in the direction substantially parallel to the central axis, the breakable connection is configured to break such that the main jacket, the engaging block and the deformable portion of the secondary tear sheet are configured to move along the central axis direction with respect to the secondary jacket.

7. The steering column of claim 5, wherein the breakable connection is in the form of a plurality of pins made of resin.

8. The steering column of claim 4, wherein the engaging member of the of the engaging block and the complementary engaging member of the main jacket are in the form of a plurality of teeth.

9. The steering column of claim 1, wherein the secondary locking mechanism comprises a lever latch being rotationally fixed to the lever such that the movement of the lever between the first and the second position is configured to be translated to the lever latch, the lever latch comprising an engaging member configured to cooperate with a complementary engaging member of the secondary jacket;

wherein in the first position of the lever, the engaging member of the lever latch is configured to be engaged with the complementary engaging member of the secondary jacket; and wherein in the second position of the lever, the engaging member of the lever latch is configured to be disengaged with the complementary engaging member of the secondary jacket.

10. The steering column of claim 3, the secondary jacket further comprising a pair of elongated portions, a pair of top portion slots and a pair of end portion slots;

wherein the first top portion slot is configured as a through hole located within the first top portion, and the second top portion slot is configured as a through hole located within the second top portion;

wherein the pair of elongated portions are configured to protrude out of the housing towards the mount bracket in a direction parallel to the central axis, each of the end portions slot is located within the respective elongated portion; and wherein the lever is configured to pass through the tilt bracket and the pair of top portion slots; and wherein length dimensions along the central axis of the top portion slots and the end portion slots define the secondary telescopic movement between the secondary jacket and the tilt bracket.

11. The steering column of claim 10, the main jacket further comprising a main body part and a main top portion, the said main top portion defining an elongated slot;

wherein the lever is configured to pass through the tilt bracket, the pair of top portion slots and the elongated slot such that a length dimension along the central axis of the elongated slot defines the primary telescopic movement between the main jacket and the secondary jacket.

12. The steering column of claim 2, wherein the engaging member of the of the lever latch and the complementary engaging member of the secondary jacket are in the form of a plurality of teeth.

13. The steering column of claim 1, the tilt bracket comprising a fixing portion through which the tilt bracket is rigidly connected to the mount bracket, and a pair of side walls;

wherein each of the side walls comprises a tilting slot through which the lever is configured to pass through, the tilting slot configured to define a lower-most position and an upper-most position of the tilt movement; and a tilting pin that is configured to pass through the side walls of the tilt bracket and the pair of end portion slots of the secondary jacket, the said tilting pin configured to define a rotational axis of the tilt movement.

14. The steering column of claim 13, the tilt locking mechanism comprising:

a tilt plate being rigidly fixed to the one side wall of the tilt bracket; and a tilt latch being configured to slight along the tilt plate in a direction corresponding to the tilt movement, the tilt latch having an engaging member configured to cooperate with a complementary engaging member of the tilt plate so that:

in the locking state of the tilt locking mechanism, the engaging member of the tilt latch is configured to be engaged with the complementary engaging member of the tilt plate; and in the release state of the of the tilt locking mechanism, the engaging member of the tilt latch is configured to be disengaged with the complementary engaging member of the tilt plate; and the tilt latch is elastically returned to the locking state.

15. The steering column of claim 14, wherein the tilt plate comprises a tilt plate slot positionally corresponding to the tilting slot of the tilt bracket side wall, and a sliding column configured to guide the tilt latch; and the tilt latch comprises a through hole;

wherein the lever is configured to pass through the tilting slot, the tilt plate slot and the tilt latch through hole.

16. The steering column of claim 15, wherein the tilt latch is configured to have a rotational movement about an axis defined by the sliding column when the tilt locking mechanism is to be switched between the locking state and the release state.

17. A vehicle comprising the steering column of claim 1, wherein the mount bracket of the steering column is rigidly fixed to a chassis of the vehicle.

18. A method of using the steering column of claim 1, wherein initially the lever is in the first position and the tilt locking mechanism, the main locking mechanism and the secondary locking mechanism are in the locking state, comprising:

actuating the lever to move the lever from the first position to the second position, the tilt locking mechanism, the main locking mechanism and the secondary locking mechanism being in the release state;

adjusting a position of the steering column so as to move the steering wheel in any one of the primary telescopic movement, secondary telescopic movement and tilt movement;

actuating the lever to move the lever from the second position to the first position, the tilt locking mechanism, the main locking mechanism and the secondary locking mechanism being back in the locking state; and in case of exposing the steering column to the external force along the central axis, deforming at least one of the deformable portion of the secondary tear sheet along the central axis and the deformable portion of the first tear sheet along the central axis.

* * * * *